US007603615B2

(12) United States Patent
Lee et al.

(10) Patent No.: US 7,603,615 B2
(45) Date of Patent: Oct. 13, 2009

(54) MULTIMEDIA PROJECTOR-PRINTER

(75) Inventors: Dar-Shyang Lee, Union City, CA (US); Jonathan J. Hull, San Carlos, CA (US); Berna Erol, Cupertino, CA (US); Jamey Graham, San Jose, CA (US)

(73) Assignee: Ricoh Co., Ltd., Tokyo (JP)

(*) Notice: Subject to any disclaimer, the term of this patent is extended or adjusted under 35 U.S.C. 154(b) by 608 days.

(21) Appl. No.: 11/094,875

(22) Filed: Mar. 30, 2005

(65) Prior Publication Data

US 2005/0223309 A1 Oct. 6, 2005

Related U.S. Application Data

(63) Continuation-in-part of application No. 10/814,842, filed on Mar. 30, 2004, and a continuation-in-part of application No. 10/814,580, filed on Mar. 30, 2004.

(51) Int. Cl.
*G06F 17/00* (2006.01)
(52) U.S. Cl. ........................................ 715/200; 715/201
(58) Field of Classification Search ................. 715/200, 715/201, 202, 205; 353/30, 79
See application file for complete search history.

(56) References Cited

U.S. PATENT DOCUMENTS

| 4,133,007 A | 1/1979 | Wessler et al. |
| 4,205,780 A | 6/1980 | Burns et al. |
| 4,437,378 A | 3/1984 | Ishida et al. |
| 4,619,522 A | 10/1986 | Imai |
| 4,635,132 A | 1/1987 | Nakamura |
| 4,703,366 A | 10/1987 | Kobori et al. |
| 4,734,898 A | 3/1988 | Morinaga |
| 4,754,485 A | 6/1988 | Klatt |
| 4,807,186 A | 2/1989 | Ohnishi et al. |
| 4,831,610 A | 5/1989 | Hoda et al. |
| 4,881,135 A | 11/1989 | Heilweil |
| 4,907,973 A | 3/1990 | Hon et al. |
| 4,998,215 A | 3/1991 | Black et al. |
| 5,059,126 A | 10/1991 | Kimball |
| 5,091,948 A | 2/1992 | Kametani |

(Continued)

FOREIGN PATENT DOCUMENTS

CA 2386829 11/2002

(Continued)

OTHER PUBLICATIONS

Karasik, Image Processing in Perl graphic applications, Google Apr. 2, 2003, pp. 1-12.*

(Continued)

*Primary Examiner*—Cong-Lac Huynh
(74) *Attorney, Agent, or Firm*—Fenwick & West LLP

(57) ABSTRACT

A multimedia projector/printer system capable of displaying, printing, and controlling all multimedia content associated with a multi-media document. The multimedia projector/printer has a multimedia image generator. A print driver interface is provided that allows users to "print" a multimedia document to the projector. The multimedia driver embeds instructions and codes within a document that are retrieved and removed before the projector produces an image. The instructions and codes indicate multimedia data to be fetched over the network. The multimedia projector/printer also provides the option to display multimedia data regardless of the software application from which created it.

29 Claims, 19 Drawing Sheets

U.S. PATENT DOCUMENTS

| | | | |
|---|---|---|---|
| 5,093,730 A | 3/1992 | Ishii et al. | |
| 5,111,285 A | 5/1992 | Fujita et al. | |
| 5,115,967 A | 5/1992 | Wedekind | |
| 5,136,563 A | 8/1992 | Takemasa et al. | |
| 5,170,935 A | 12/1992 | Federspiel et al. | |
| 5,220,649 A | 6/1993 | Forcier | |
| 5,231,698 A | 7/1993 | Forcier | |
| 5,237,648 A | 8/1993 | Mills et al. | |
| 5,270,989 A | 12/1993 | Kimura | |
| 5,343,251 A | 8/1994 | Nafeh | |
| 5,386,510 A | 1/1995 | Jacobs | |
| 5,428,555 A | 6/1995 | Starkey et al. | |
| 5,432,532 A | 7/1995 | Mochimaru et al. | |
| 5,436,792 A | 7/1995 | Leman et al. | |
| 5,438,426 A | 8/1995 | Miake et al. | |
| 5,444,476 A | 8/1995 | Conway | |
| 5,479,600 A | 12/1995 | Wroblewski et al. | |
| 5,480,306 A | 1/1996 | Liu | |
| 5,485,554 A | 1/1996 | Lowitz et al. | |
| 5,493,409 A | 2/1996 | Maeda et al. | |
| 5,524,085 A * | 6/1996 | Bellucco et al. | 709/248 |
| 5,566,271 A | 10/1996 | Tomitsuka et al. | |
| 5,568,406 A | 10/1996 | Gerber | |
| 5,572,651 A | 11/1996 | Weber et al. | |
| 5,576,950 A | 11/1996 | Tonomura et al. | |
| 5,581,366 A | 12/1996 | Merchant et al. | |
| 5,590,257 A | 12/1996 | Forcier | |
| 5,596,698 A | 1/1997 | Morgan | |
| 5,617,138 A | 4/1997 | Ito et al. | |
| 5,624,265 A | 4/1997 | Redford et al. | |
| 5,627,936 A | 5/1997 | Prasad et al. | |
| 5,628,684 A | 5/1997 | Bouedec | |
| 5,633,723 A | 5/1997 | Sugiyama et al. | |
| 5,640,193 A | 6/1997 | Wellner | |
| 5,661,506 A | 8/1997 | Lazzouni et al. | |
| 5,661,783 A | 8/1997 | Assis | |
| 5,682,330 A | 10/1997 | Seaman et al. | |
| 5,682,540 A | 10/1997 | Klotz et al. | |
| 5,690,496 A | 11/1997 | Kennedy | |
| 5,706,097 A | 1/1998 | Schelling et al. | |
| 5,717,841 A | 2/1998 | Farrell et al. | |
| 5,721,883 A | 2/1998 | Katsuo et al. | |
| 5,729,665 A | 3/1998 | Gauthier | |
| 5,749,735 A | 5/1998 | Redford et al. | |
| 5,757,897 A | 5/1998 | LaBarbera et al. | |
| 5,761,380 A | 6/1998 | Lewis et al. | |
| 5,764,368 A | 6/1998 | Shibaki et al. | |
| 5,774,260 A | 6/1998 | Petitto et al. | |
| 5,793,869 A | 8/1998 | Claflin, Jr. | |
| 5,804,803 A | 9/1998 | Cragun et al. | |
| 5,845,144 A | 12/1998 | Tateyama et al. | |
| 5,877,764 A | 3/1999 | Feitelson et al. | |
| 5,884,056 A | 3/1999 | Steele | |
| 5,903,538 A | 5/1999 | Fujita et al. | |
| 5,936,542 A | 8/1999 | Kleinrock et al. | |
| 5,938,727 A | 8/1999 | Ikeda | |
| 5,940,776 A | 8/1999 | Baron et al. | |
| 5,941,936 A | 8/1999 | Taylor | |
| 5,945,998 A | 8/1999 | Eick | |
| 5,949,879 A | 9/1999 | Berson et al. | |
| 5,962,839 A | 10/1999 | Eskildsen | |
| 5,974,189 A | 10/1999 | Nicponski | |
| 5,987,226 A | 11/1999 | Ishikawa et al. | |
| 5,999,173 A | 12/1999 | Ubillos | |
| 6,000,030 A | 12/1999 | Steinberg et al. | |
| 6,006,241 A | 12/1999 | Purnaveja et al. | |
| 6,020,916 A | 2/2000 | Gerszberg et al. | |
| 6,038,567 A | 3/2000 | Young | |
| 6,043,904 A | 3/2000 | Nickerson | |
| 6,076,733 A | 6/2000 | Wilz, Sr. et al. | |
| 6,076,734 A | 6/2000 | Dougherty et al. | |
| 6,081,261 A | 6/2000 | Wolff et al. | |
| 6,098,106 A | 8/2000 | Philyaw et al. | |
| 6,106,457 A | 8/2000 | Perkins et al. | |
| 6,108,656 A | 8/2000 | Durst et al. | |
| 6,111,567 A | 8/2000 | Savchenko et al. | |
| 6,115,718 A | 9/2000 | Huberman et al. | |
| 6,118,888 A | 9/2000 | Chino et al. | |
| 6,123,258 A | 9/2000 | Iida | |
| 6,125,229 A | 9/2000 | Dimitrova et al. | |
| 6,138,151 A | 10/2000 | Reber et al. | |
| 6,141,001 A * | 10/2000 | Baleh | 715/203 |
| 6,148,094 A | 11/2000 | Kinsella | |
| 6,152,369 A | 11/2000 | Wilz, Sr. et al. | |
| 6,153,667 A | 11/2000 | Howald | |
| 6,167,033 A | 12/2000 | Chang et al. | |
| 6,170,007 B1 | 1/2001 | Venkatraman et al. | |
| 6,175,489 B1 | 1/2001 | Markow et al. | |
| 6,189,009 B1 | 2/2001 | Stratigos et al. | |
| 6,193,658 B1 | 2/2001 | Wendelken et al. | |
| 6,199,042 B1 | 3/2001 | Kurzweil | |
| 6,256,638 B1 | 7/2001 | Dougherty et al. | |
| 6,266,053 B1 | 7/2001 | French et al. | |
| 6,296,693 B1 | 10/2001 | McCarthy | |
| 6,297,812 B1 | 10/2001 | Ohara et al. | |
| 6,297,851 B1 | 10/2001 | Taubman et al. | |
| 6,298,145 B1 | 10/2001 | Zhang et al. | |
| 6,302,527 B1 | 10/2001 | Walker | |
| 6,307,956 B1 | 10/2001 | Black | |
| 6,308,887 B1 | 10/2001 | Korman et al. | |
| 6,330,976 B1 | 12/2001 | Dymetman et al. | |
| 6,360,057 B1 | 3/2002 | Tsumagari et al. | |
| 6,369,811 B1 | 4/2002 | Graham et al. | |
| 6,373,498 B1 | 4/2002 | Abgrall | |
| 6,373,585 B1 | 4/2002 | Mastie et al. | |
| 6,375,298 B2 | 4/2002 | Purcell et al. | |
| 6,378,070 B1 | 4/2002 | Chan et al. | |
| 6,381,614 B1 | 4/2002 | Barnett et al. | |
| 6,400,996 B1 | 6/2002 | Hoffberg et al. | |
| 6,417,435 B2 | 7/2002 | Chantzis et al. | |
| 6,421,738 B1 | 7/2002 | Ratan et al. | |
| 6,439,465 B1 | 8/2002 | Bloomberg | |
| 6,442,336 B1 | 8/2002 | Lemelson | |
| 6,452,615 B1 | 9/2002 | Chiu et al. | |
| 6,466,534 B2 | 10/2002 | Cundiff, Sr. | |
| 6,476,793 B1 | 11/2002 | Motoyama et al. | |
| 6,476,834 B1 | 11/2002 | Doval et al. | |
| 6,502,114 B1 | 12/2002 | Forcier | |
| D468,277 S | 1/2003 | Sugiyama | |
| 6,502,756 B1 | 1/2003 | Fåhraeus | |
| 6,504,620 B1 | 1/2003 | Kinjo | |
| 6,515,756 B1 | 2/2003 | Mastie et al. | |
| 6,519,360 B1 | 2/2003 | Tanaka | |
| 6,529,920 B1 | 3/2003 | Arons et al. | |
| 6,535,639 B1 | 3/2003 | Uchihachi et al. | |
| 6,544,294 B1 | 4/2003 | Greenfield et al. | |
| 6,552,743 B1 | 4/2003 | Rissman | |
| 6,556,241 B1 | 4/2003 | Yoshimura et al. | |
| 6,568,595 B1 | 5/2003 | Russell et al. | |
| 6,581,070 B1 | 6/2003 | Gibbon et al. | |
| 6,587,859 B2 | 7/2003 | Dougherty et al. | |
| 6,593,860 B2 * | 7/2003 | Lai et al. | 341/50 |
| 6,594,377 B1 | 7/2003 | Kim et al. | |
| 6,611,276 B1 | 8/2003 | Muratori et al. | |
| 6,611,622 B1 | 8/2003 | Krumm | |
| 6,611,628 B1 | 8/2003 | Sekiguchi et al. | |
| 6,625,334 B1 | 9/2003 | Shiota et al. | |
| 6,647,534 B1 | 11/2003 | Graham | |
| 6,647,535 B1 | 11/2003 | Bozdagi et al. | |
| 6,654,887 B2 | 11/2003 | Rhoads | |
| 6,665,092 B2 | 12/2003 | Reed | |
| 6,674,538 B2 | 1/2004 | Takahashi | |
| 6,678,389 B1 | 1/2004 | Sun et al. | |
| 6,687,383 B1 | 2/2004 | Kanevsky et al. | |

| | | | | | | |
|---|---|---|---|---|---|---|
| 6,700,566 B2 | 3/2004 | Shimoosawa et al. | 2002/0067503 A1 | 6/2002 | Hiatt | |
| 6,701,369 B1 | 3/2004 | Philyaw | 2002/0078149 A1* | 6/2002 | Chang et al. ................. 709/203 | |
| 6,724,494 B1 | 4/2004 | Danknick | 2002/0087530 A1* | 7/2002 | Smith et al. ..................... 707/3 | |
| 6,728,466 B1 | 4/2004 | Tanaka | 2002/0087598 A1 | 7/2002 | Carro | |
| 6,745,234 B1 | 6/2004 | Philyaw et al. | 2002/0095501 A1 | 7/2002 | Chiloyan et al. | |
| 6,750,978 B1 | 6/2004 | Marggraff et al. | 2002/0099534 A1 | 7/2002 | Hegarty | |
| 6,753,883 B2 | 6/2004 | Schena et al. | 2002/0101343 A1 | 8/2002 | Patton | |
| 6,771,283 B2 | 8/2004 | Carro | 2002/0101513 A1 | 8/2002 | Halverson | |
| 6,772,947 B2 | 8/2004 | Shaw | 2002/0131071 A1 | 9/2002 | Parry | |
| 6,774,951 B2 | 8/2004 | Narushima | 2002/0131078 A1* | 9/2002 | Tsukinokizawa ........... 358/1.15 | |
| 6,775,651 B1 | 8/2004 | Lewis et al. | 2002/0134699 A1 | 9/2002 | Bradfield et al. | |
| 6,807,303 B1 | 10/2004 | Kim et al. | 2002/0135800 A1 | 9/2002 | Dutta | |
| 6,824,044 B1 | 11/2004 | Lapstun et al. | 2002/0137544 A1 | 9/2002 | Myojo | |
| 6,845,913 B2 | 1/2005 | Madding et al. | 2002/0140993 A1 | 10/2002 | Silverbrook | |
| 6,853,980 B1 | 2/2005 | Ying et al. | 2002/0159637 A1 | 10/2002 | Echigo et al. | |
| 6,856,415 B1 | 2/2005 | Simchik et al. | 2002/0165769 A1 | 11/2002 | Ogaki et al. | |
| 6,871,780 B2 | 3/2005 | Nygren et al. | 2002/0169849 A1 | 11/2002 | Schroath | |
| 6,877,134 B1 | 4/2005 | Fuller et al. | 2002/0171857 A1 | 11/2002 | Hisatomi et al. | |
| 6,883,162 B2 | 4/2005 | Jackson et al. | 2002/0185533 A1 | 12/2002 | Shieh et al. | |
| 6,886,750 B2 | 5/2005 | Rathus et al. | 2002/0199149 A1 | 12/2002 | Nagasaki et al. | |
| 6,892,193 B2 | 5/2005 | Bolle et al. | 2003/0002068 A1 | 1/2003 | Constantin et al. | |
| 6,898,709 B1 | 5/2005 | Teppler | 2003/0007776 A1 | 1/2003 | Kameyama et al. | |
| 6,904,168 B1 | 6/2005 | Steinberg et al. | 2003/0014615 A1 | 1/2003 | Lynggaard | |
| 6,904,451 B1* | 6/2005 | Orfitelli et al. ............... 709/203 | 2003/0024975 A1 | 2/2003 | Rajasekharan | |
| 6,923,721 B2 | 8/2005 | Luciano et al. | 2003/0025951 A1 | 2/2003 | Pollard et al. | |
| 6,931,594 B1 | 8/2005 | Jun | 2003/0038971 A1 | 2/2003 | Renda | |
| 6,938,202 B1 | 8/2005 | Matsubayashi et al. | 2003/0051214 A1 | 3/2003 | Graham et al. | |
| 6,946,672 B1 | 9/2005 | Lapstun et al. | 2003/0065925 A1 | 4/2003 | Shindo et al. | |
| 6,950,623 B2 | 9/2005 | Brown et al. | 2003/0076521 A1 | 4/2003 | Li et al. | |
| 6,964,374 B1 | 11/2005 | Djuknic et al. | 2003/0084462 A1 | 5/2003 | Kubota et al. | |
| 6,966,495 B2 | 11/2005 | Lynggaard et al. | 2003/0088582 A1 | 5/2003 | Pflug | |
| 6,983,482 B2 | 1/2006 | Morita et al. | 2003/0093384 A1 | 5/2003 | Durst et al. | |
| 7,000,193 B1 | 2/2006 | Impink, Jr. et al. | 2003/0110926 A1 | 6/2003 | Sitrick et al. | |
| 7,023,459 B2 | 4/2006 | Arndt et al. | 2003/0117652 A1 | 6/2003 | Lapstun | |
| 7,031,965 B1 | 4/2006 | Moriya et al. | 2003/0121006 A1 | 6/2003 | Tabata et al. | |
| 7,073,119 B2 | 7/2006 | Matsubayashi et al. | 2003/0128877 A1 | 7/2003 | Nicponski | |
| 7,075,676 B2 | 7/2006 | Owen | 2003/0146927 A1 | 8/2003 | Crow et al. | |
| 7,079,278 B2* | 7/2006 | Sato ........................... 358/1.15 | 2003/0160898 A1 | 8/2003 | Baek et al. | |
| 7,089,420 B1 | 8/2006 | Durst et al. | 2003/0164898 A1 | 9/2003 | Imai | |
| 7,092,568 B2 | 8/2006 | Eaton | 2003/0177240 A1 | 9/2003 | Gulko et al. | |
| 7,131,058 B1 | 10/2006 | Lapstun et al. | 2003/0187642 A1 | 10/2003 | Ponceleon et al. | |
| 7,134,016 B1 | 11/2006 | Harris | 2003/0218597 A1* | 11/2003 | Hodzic et al. ................ 345/158 | |
| 7,149,957 B2 | 12/2006 | Hull et al. | 2003/0220988 A1 | 11/2003 | Hymel | |
| 7,151,613 B1 | 12/2006 | Ito | 2003/0231198 A1 | 12/2003 | Janevski | |
| 7,152,206 B1 | 12/2006 | Tsuruta | 2004/0024643 A1* | 2/2004 | Pollock et al. ................. 705/16 | |
| 7,162,690 B2 | 1/2007 | Gupta et al. | 2004/0036842 A1* | 2/2004 | Tsai et al. ..................... 353/31 | |
| 7,174,151 B2 | 2/2007 | Lynch et al. | 2004/0039723 A1* | 2/2004 | Lee et al. ....................... 707/1 | |
| 7,181,502 B2 | 2/2007 | Incertis | 2004/0044894 A1 | 3/2004 | Lofgren et al. | |
| 7,196,808 B2 | 3/2007 | Kofman et al. | 2004/0049681 A1 | 3/2004 | Diehl et al. | |
| 7,215,436 B2 | 5/2007 | Hull et al. | 2004/0064207 A1 | 4/2004 | Zacks et al. | |
| 7,228,492 B1 | 6/2007 | Graham | 2004/0118908 A1 | 6/2004 | Ando et al. | |
| 7,260,828 B2 | 8/2007 | Aratani et al. | 2004/0125402 A1 | 7/2004 | Kanai et al. | |
| 7,263,659 B2 | 8/2007 | Hull et al. | 2004/0128514 A1 | 7/2004 | Rhoads | |
| 7,263,671 B2 | 8/2007 | Hull et al. | 2004/0128613 A1 | 7/2004 | Sinisi | |
| 7,280,738 B2 | 10/2007 | Kauffman et al. | 2004/0143459 A1 | 7/2004 | Engleson et al. | |
| 7,298,512 B2 | 11/2007 | Reese et al. | 2004/0143602 A1 | 7/2004 | Ruiz et al. | |
| 7,313,808 B1 | 12/2007 | Gupta et al. | 2004/0150627 A1* | 8/2004 | Luman et al. ................ 345/173 | |
| 7,363,580 B2 | 4/2008 | Tabata et al. | 2004/0156616 A1 | 8/2004 | Strub et al. | |
| 2001/0003846 A1 | 6/2001 | Rowe et al. | 2004/0167895 A1 | 8/2004 | Carro | |
| 2001/0017714 A1 | 8/2001 | Komatsu et al. | 2004/0184064 A1* | 9/2004 | TaKeda et al. .............. 358/1.13 | |
| 2001/0037408 A1 | 11/2001 | Thrift et al. | 2004/0207876 A1* | 10/2004 | Aschenbrenner et al. ... 358/1.18 | |
| 2001/0052942 A1 | 12/2001 | MacCollum et al. | 2004/0215470 A1* | 10/2004 | Bodin ........................... 705/1 | |
| 2002/0001101 A1 | 1/2002 | Hamura et al. | 2004/0229195 A1 | 11/2004 | Marggraff et al. | |
| 2002/0004807 A1 | 1/2002 | Graham et al. | 2004/0240541 A1 | 12/2004 | Chadwick et al. | |
| 2002/0006100 A1 | 1/2002 | Cundiff, Sr. et al. | 2004/0249650 A1 | 12/2004 | Freedman et al. | |
| 2002/0010641 A1 | 1/2002 | Stevens et al. | 2005/0034057 A1* | 2/2005 | Hull et al. ................. 715/500.1 | |
| 2002/0011518 A1 | 1/2002 | Goetz et al. | 2005/0038794 A1 | 2/2005 | Piersol | |
| 2002/0015066 A1 | 2/2002 | Siwinski et al. | 2005/0064935 A1 | 3/2005 | Blanco | |
| 2002/0023957 A1 | 2/2002 | Michaelis et al. | 2005/0068569 A1 | 3/2005 | Hull et al. | |
| 2002/0048224 A1 | 4/2002 | Dygert et al. | 2005/0068581 A1 | 3/2005 | Hull et al. | |
| 2002/0051010 A1 | 5/2002 | Jun et al. | 2005/0083413 A1 | 4/2005 | Reed et al. | |
| 2002/0060748 A1 | 5/2002 | Aratani et al. | 2005/0125717 A1 | 6/2005 | Segal et al. | |
| 2002/0066782 A1 | 6/2002 | Swaminathan et al. | 2005/0149849 A1 | 7/2005 | Graham et al. | |

| | | | |
|---|---|---|---|
| 2005/0213153 | A1 | 9/2005 | Hull et al. |
| 2005/0216838 | A1 | 9/2005 | Graham |
| 2005/0216852 | A1 | 9/2005 | Hull et al. |
| 2005/0231739 | A1* | 10/2005 | Lee et al. ............... 358/1.1 |
| 2006/0043193 | A1 | 3/2006 | Brock |
| 2006/0136343 | A1 | 6/2006 | Coley et al. |
| 2006/0171559 | A1 | 8/2006 | Rhoads |
| 2006/0250585 | A1* | 11/2006 | Anderson et al. ......... 353/79 |
| 2007/0033419 | A1 | 2/2007 | Kocher et al. |
| 2007/0065094 | A1* | 3/2007 | Chien et al. ............. 386/46 |
| 2007/0109397 | A1* | 5/2007 | Yuan et al. ............ 348/14.02 |
| 2007/0162858 | A1* | 7/2007 | Hurley et al. ............ 715/732 |
| 2007/0168426 | A1* | 7/2007 | Ludwig et al. ............ 709/204 |
| 2007/0234196 | A1* | 10/2007 | Nicol et al. ............ 715/501.1 |
| 2007/0268164 | A1* | 11/2007 | Lai et al. ................ 341/51 |
| 2008/0037043 | A1* | 2/2008 | Hull et al. ............... 358/1.8 |

FOREIGN PATENT DOCUMENTS

| | | |
|---|---|---|
| CN | 1352765 A | 6/2002 |
| CN | 1097394 C | 12/2002 |
| EP | 1079313 A2 | 2/2001 |
| EP | 1133170 A2 | 9/2001 |
| JP | H10-49761 | 2/1998 |
| JP | H11-341423 | 12/1999 |
| JP | 2001-228994 A | 8/2001 |
| WO | WO 99/18523 | 4/1999 |
| WO | WO 02/082316 A1 | 10/2002 |

OTHER PUBLICATIONS

Hardman et al., Integrating the Amsterdam Hypermedia Model with the Standard Reference Model for Intelligent Multimedia Presentation Systems, Google 1997, pp. 497-507.*

Groot, Multimedia Projectors: A Key Component in the Classroom of the Future, Google Jun. 2002, pp. 1-4.*

Shelbourn et al., Multimedia in Construction Education: New Dimensions, Google 2001, pp. 265-274.*

Lamming, M. et al., "Using Automatically Generated Descriptions of Human Activity to Index Multi-media Data," IEEE Multimedia Communications and Applications IEE Colloquium, Feb. 7, 1991, pp. 5/1-5/3.

Gropp, W. et al., "Using MPI-Portable Programming with the Message Passing Interface," copyright 1999, pp. 35-42, second edition, MIT Press.

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3%...>.

Label Producer by Maxell, [online] [Retrieved on Nov. 11, 2003]. Retrieved from the Internet<URL: http://www.maxell.co.jp/products/consumer/rabel_card/>.

Movie-PhotoPrint by Canon, [online] [Retrieved on Nov. 11, 2003]. Retrieved from the Internet<URL: http://cweb.canon.jp/hps/guide/rimless.html>.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk By Barcode by Epson, [online] [Retrieved on Nov. 11, 2003]. Retrieved from the Internet<URL: http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 ScanTalk [online] (date unknown). Retrieved from the Internet<URL: http://homepage2.nifty.com/vasolza/ScanTalk.htm>.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Communication Pursuant to Article 96(2) EPC, European Application No. 04255836.1, Jun. 11, 2007, 10 pages.

Stifelman, L. et al., "The Audio Notebook," SIGCHI 2001, Mar. 31-Apr. 5, 2001, pp. 182-189, vol. 3, No. 1, Seattle, WA.

Chinese Application No. 2004100849823 Office Action, Jun. 1, 2007, 24 pages.

Chinese Application No. 2004100897988 Office Action, Apr. 6, 2007, 8 pages.

Poon, K.M. et al., "Performance Analysis of Median Filtering on Meiko™—A Distributed Multiprocessor System," IEEE First International Conference on Algorithms and Architectures for Parallel Processing, 1995, pp. 631-639.

Configuring A Printer (NT), Oxford Computer Support [online] [Retrieved on Nov. 13, 2003] Retrieved from the Internet<URL: http://www.nox.ac.uk/cehoxford/ccs/facilities/printers/configrnt.htm>.

"DocumentMall Secure Document Management" [online] [Retrieved on Mar. 9, 2004). Retrieved from the Internet<URL: http://www.documentmall.com>.

Gopal, S. et al., "Load Balancing in a Heterogeneous Computing Environment," Proceedings of the Thirty-First Hawaii International Conference on System Sciences, Jan. 6-9, 1998.

Girgensohn, Andreas et al., "Time-Constrained Keyframe Selection Technique," Multimedia Tools and Applications (2000), vol. 11, pp. 347-358.

Graham, Jamey et al., "A Paper-Based Interface for Video Browsing and Retrieval," IEEE International Conference on Multimedia and Expo (Jul. 6-9, 2003), vol. 2, P:II 749-752.

Graham, Jamey et al., "The Video Paper Multimedia Playback System," Proceedings of the 11th ACM International Conference on Multimedia (Nov. 2003), pp. 94-95.

Graham, Jamey et al., "Video Paper: A Paper-Based Interface for Skimming and Watching Video," International Conference on Consumer Electronics (Jun. 16-18, 2002), pp. 214-215.

Gropp, W. et al., "Using MPI—Portable Programming with the Message-Passing Interface," copyright 1999, pp. 35-42, second edition, MIT Press.

Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.

"Kofax: Ascent Capture: Overview" [online] [Retrieved on Jan. 22, 2004]. Retrieved form the Internet: <URL http://www.kofax.com/products/ascent/capture>.

PostScript Language Document Structuring Conventions Specification, Version 3.0 (Sep. 25, 1992), Adobe Systems Incorporated.

"Seiko Instruments USA, Inc.—Business and Home Office Products" online, date unknown, Seiko Instruments USA, Inc., [retrieved on Jan. 25, 2005]. Retrieved from the Internet: <URL: http://www.siibusinessproducts.com/products/link-ir-p-html>.

"Tasty FotoArt" [online], date unknown, Tague Technologies, Inc., [retrieved on Mar. 8, 2005]. Retrieved from the Internet: <URL: http//www.tastyfotoart.com>.

Dimitrova, N. et al., "Applications of Video-Content Analysis and Retrieval," IEEE Multimedia, Jul.-Sep. 2002, pp. 42-55.

European Search Report, EP 04255836, Sep. 12, 2006, 4 pages.
European Search Report, EP 04255837, Sep. 5, 2006, 3 pages.
European Search Report, EP 04255839, Sep. 4, 2006, 3 pages.
European Search Report, EP 04255840, Sep. 12, 2006, 3 pages.

Graham, J. et al., "A Paper-Based Interface for Video Browsing and Retrieval," ICME '03, Jul. 6-9, 2003, pp. 749-752, vol. 2.

Graham, J. et al., "Video Paper: A Paper-Based Interface for Skimming and Watching Video," ICCE '02, Jun. 18-20, 2002, pp. 214-215.

Klemmer, S.R. et al., "Books With Voices: Paper Transcripts as a Tangible Interface to Oral Histories," CHI Letters, Apr. 5-10, 2003, pp. 89-96, vol. 5, Issue 1.

Minami, K. et al., "Video Handling with Music and Speech Detection," IEEE Multimedia, Jul.-Sep. 1998, pp. 17-25.

Shahraray, B. et al, "Automated Authoring of Hypermedia Documents of Video Programs," ACM Multimedia '95 Electronic Proceedings, San Francisco, CA, Nov. 5-9, 1995, pp. 1-12.

Shahraray, B. et al., "Pictorial Transcripts: Multimedia Processing Applied to Digital Library Creation," IEEE, 1997, pp. 581-586.

Brown et al., "A Diary Study Of Information Capture In Working Life," Proceedings of ACM CHI 2000 Conference On Human Factors In Computing Systems, 2000, pp. 438-445, vol. 1.

Erol, B. et al., "Linking Multimedia Presentations With Their Symbolic Source Documents: Algorithm And Applications," ACM Multimedia '03, Nov. 2-8, 2003, pp. 498-507, Berkeley, CA.

U.S. Appl. No. 10/660,867, filed Sep. 12, 2003, Erol et al.

U.S. Appl. No. 09/714,785, filed Nov. 15, 2000, Hull et al.

Erol, B. et al., "Prescient Paper: Multimedia Document Creation With Document Image Matching," $17^{th}$ International Conference On Pattern Recognition, Aug. 2004, 4 pages, Cambridge, U.K.

Erol, B. et al, "Retrieval Of Presentation Recordings With Digital Camera Images," IEE Conference On Computer Vision And Pattern Recognition (CVPR), Jun. 27-Jul. 2, 2004, 2 pages, Washington, D.C.

Lienhart, R. et al., "Localizing And Segmenting Text In Images And Videos," IEEE Transactions On Circuits And Systems For Video Technology, Apr. 2002, pp. 256-268, vol. 12, No. 4.

"Microsoft Powerpoint—Wikipedia, the free encyclopedia," Wikimedia Foundation, Inc., [online] [Retrieved on Nov. 7, 2006] Retrieved from the internet <URL:http://en.wikipedia.org/wiki/Microsoft_PowerPoint>.

Otsu, N., "A Threshold Selection method From Gray-Level Histograms," IEEE Transactions on Systems, Man and Cybernetics, Jan. 1979, pp. 62-66, vol. SMC-9, No. 1.

Srihari, S.N. et al., "Name And Address Block Reader System For Tax Form Processing," IEEE, 1995, pp. 5-10.

Lauesen, S., "User Interface Design: A Software Engineering Perspective," 2005, 28 pages, Pearson Education Limited.

Arai, T. et al., "PaperLink: A Technique for Hyperlinking from Real Paper to Electronic Content," CHI 97, Atlanta, GA, Mar. 22-27, 1997, pp. 327-334.

Dorai, C. et al., "End-to-End VideoText Recognition for Multimedia Content Analysis," IEEE, International Conference on Multimedia and Expo, Aug. 2001, pp. 601-604.

Hecht, D.L., "Printed Embedded Data Graphical User Interfaces," Computer, Mar. 2001, pp. 47-55, vol. 34, Issue 3.

Klemmer, S.R. et al., "Books with Voices: Paper Transcripts as a Tangible Interface to Oral Histories," CHI 2003, Fort Lauderdale, FL, Apr. 5-10, 2003, pp. 89-96.

Boreczky, J. et al., "An Interactive Comic Book Presentation for Exploring Video," CHI Letters, Apr. 1-6, 2000, pp. 185-192, vol. 2, Issue 1.

Buchanan, M.C. et al., "Multimedia Documents as User Interfaces," INTERCHI '93, Amsterdam, The Netherlands, Apr. 24-29, 1993, pp. 527-528.

Harada, K. et al., "Anecdote: A Multimedia Storyboarding System with Seamless Authoring Support," ACM Multimedia '96, Boston, MA, 1996, pp. 341-351.

Mackay, W. et al., "Augmenting Reality: Adding Computational Dimensions to Paper," Communications of the ACM, Jul. 1993, pp. 96-97, vol. 36, No. 7.

Mackay, W. et al., "Video Mosaic: Laying Out Time in a Physical Space," Multimedia '94, San Francisco, CA, Oct. 1994, pp. 165-172.

Makedon, F. et al., "Multimedia Authoring, Development Environments and Digital Video Editing," Dartmouth College Technical Report, PCS-TR94-231, 2001, pp. 1-24.

Nelson, L. et al, "Palette: A Paper Interface for Giving Presentations," CHI '99, May 1999, pp. 1-8.

Roschelle, J. et al., "VideoNoter: A Productivity Tool for Video Data Analysis," Behavior Research Methods, Instruments & Computers, 1991, pp. 219-224, vol. 23, No. 2.

Tonomura, Y. et al., "VideMAP and VideoSpaceIcon," INTERCHI '93, Amsterdam, The Netherlands, Apr. 24-29, 1993, pp. 131-136 and 544.

Wellner, P., "Interacting with Paper on the DigitalDesk," Communications of the ACM, Jul. 1993, pp. 87- 96, vol. 36, No. 7.

\* cited by examiner

MULTIMEDIA PROJECTOR-PRINTER

CROSS-REFERENCES TO RELATED APPLICATIONS

This application is a continuation-in-part of the following co-pending U.S. patent applications, each of which is hereby incorporated by reference in its entirety: U.S. patent application Ser. No. 10/814,580, titled "Printer With Document-Triggered Processing," by Jonathan J. Hull, Kurt W. Piersol and Peter E. Hart, filed Mar. 30, 2004, and U.S. patent application Ser. No. 10/814,842, titled "Printer with Multimedia Server," by Jonathan J. Hull, Jamey Graham, Peter E. Hart, and Kurt W. Piersol, filed Mar. 30, 2004.

BACKGROUND OF THE INVENTION

1. Field of the Invention

The present invention relates generally to the field of generating images or multi-media documents from digital data. More specifically, the present invention relates to receiving multimedia documents containing a variety of data formats and outputting the multimedia document in a variety of formats.

2. Description of the Related Art

Data projectors are well known and have become commonplace in the home and business environment. Conventional data projectors are designed to display electronic documents formatted in a projectable image format like RGB or CYN. Typically, a "host" personal computer (PC) or laptop computer is physically connected to the projector such that a presentation document is hosted on the "host" PC and then sent to the projector for display on a screen. A user controls the desired appearance of the presentation document through the laptop or PC.

A conventional projector 102 is shown in FIG. 1 and includes a memory 104, an image processing unit 106, a display controller 108, a system controller 110, a video decoder (codec) 114 and optics 116. The system controller 110 of the projector 102 receives raw video data 112 (like RGB data) and stores the data in the memory buffer 104. The memory buffer 104 is used to store the data in various formats before use by the video decoder 114, the image processing unit 106 and the display controller 108. Once stored in the memory buffer 104, the video decoder 114 converts the raw video data into a format that is understandable to the image processing unit 106. After conversion by the decoder 114, the video data is converted to pixel and color data by the image processing unit 106. Finally, the display controller 108 and optics 116 use the pixel and color data to generate an image in light output by the projector 102 and displayed on the screen 118.

A distinct disadvantage with conventional projectors occurs when a user is preparing to display a presentation. The user must first verify that the particular software program (or application) that created the multi-media document is available on the laptop or PC that has been selected to host the presentation. Oftentimes, the particular specialized applications available on the hosting PC or laptop are quite different than the applications available on the PC or laptop where the document was created. Supporting multiple copies of costly multi-media applications on multiple PCs or laptops is possible, particularly for organizations like public schools and small businesses where only a limited number of licenses to a particular software application might be available. Another disadvantage relates to the resolution of the display of a multi-media document on a conventional digital projector being constrained by the resolution of the PC or laptop that is hosting the presentation.

Like data projectors, printers are also well known and have become ubiquitous. Conventional printers are designed to print electronic documents formatted in a standard printer language, like postscript or printer control language (PCL). These types of printer languages are standard within the printer industry, thus allowing universal compatibility with a variety of machines manufactured by a variety of different companies. Documents rendered in a standard page description language (PDL) such as PCL or postscript, describe the page to be printed in terms of primitive shapes which are interpreted by the printer's own controller. A conventional printer typically ignores any non-PDL data content contained within a document to be printed when an image is being rendered.

A conventional printer 202 including an input/output (I/O) controller 204; a memory unit 212; an image processing unit 208 coupled to memory unit 212; a print codec 214; print engine 206; and a system controller 210 coupled to the I/O controller 204, image processing unit 208, print codec 214, memory unit 212 and print engine 206; is shown in FIG. 2. Input/output controller 204 receives and directs incoming raw image data 225 (i.e., a description of a document in a language understood by the printer 202, such as PCL or postscript data) to the system controller 210 for distribution and storage in printer 202. Raw image data 225 is converted (if necessary) by the print codec 214 and the image-processing unit 208 renders the converted data, at a print element level, in preparation for the data to be printed as document 220 by the print engine 206. Memory unit 212 is available to store multiple decompressed data print files for printing, based on the order in which the Input/output controller I/O 204 receives the incoming image data 225. For example, memory unit 212 allows the printer 202 to receive data faster than it can be printed such that the printer 202 can do another task while printing continues.

Unfortunately, postscript, PCL and other PDLs are not designed to support embedded multimedia content (i.e. motion video, audio, still images, graphics, animation, text, etc), which is a common data format for many conventional presentation and entertainment based software packages. The primitive nature of the postscript language does not allow for is use when creating a presentation document, particularly ones that contains video, audio, or animation. Therefore, conventional printers are traditionally not capable of interpreting and printing documents containing multimedia content due to the fact that conventional printers are configured to receive documents formatted in the aforementioned standard printer languages that have a format of a single image per page. Also, conventional printers, and conventional projectors for that matter, are designed to support documents formatted only in their particular individual formats (i.e. PCL or RGB but not both). Standard printers and projectors have not been combined to form a multifunction output device that is capable of receiving data in a variety of different formats and outputting this data in any particular format requested by a user.

What is needed is a digital projector/printer system for receiving a document containing multi-formatted data, independent of the software application from which the document was created, and outputting the multi-media document in a variety of formats.

SUMMARY OF THE INVENTION

The present invention satisfies the foregoing need by providing a digital projector/printer system capable of displaying, printing, and controlling all multimedia content associated with a multi-media document. Associated with the projector/printer system are projector/printer drivers that can render the document in standard postscript and embed special instructions and codes that the projector/printer understands. In one embodiment, the embedded instructions and codes are placed inserted as comments in the code for the document. These embedded instructions and codes are instructions on where to fetch the media object over the network, and how to display it with respect to the rest of the page image, including the resolution and color of a display, or other relevant information. Advantageously, these embedded instructions and codes are ignored by conventional printers and projectors so the documents if processed by such printers or projectors are unaffected. With the projector/printer of the present invention, the embedded instructions and codes are parsed, interpreted and processed by the system controller inside the digital projector/printer to produce the desired result. Furthermore, the projection system can render a symbolic document at much higher quality than conventional digital projection systems since the system is not limited by the resolution of a PC or laptop running the application.

Another embodiment for handling multimedia documents discloses a driver, located on a computing device that converts portions of presentation documents, like Microsoft PowerPoint documents, to video data and embeds this video data within a PDL document for display. In this embodiment, special features such as animation or full motion are rendered in a different video clip. The document can include individual slides of data for presentation, with the video clips inserted between pages. When users move forward or backward through the slides, the appropriate video clip is shown. In this embodiment, multimedia documents can be rendered and displayed through the claimed digital projector/printer without the need for proprietary software.

The present invention is also capable of controlling a multimedia presentation through the use of a page description language. In this case, a driver on the user's PC embeds control code within a PDL document and sends the multimedia document to the projector/printer for display or printing. The system controller within the projector/printer recognizes the control code and retrieves the parameters associated with the code to provide control over the multimedia document when it is displayed.

DETAILED DESCRIPTION OF THE PREFERRED EMBODIMENTS

Figure 1:
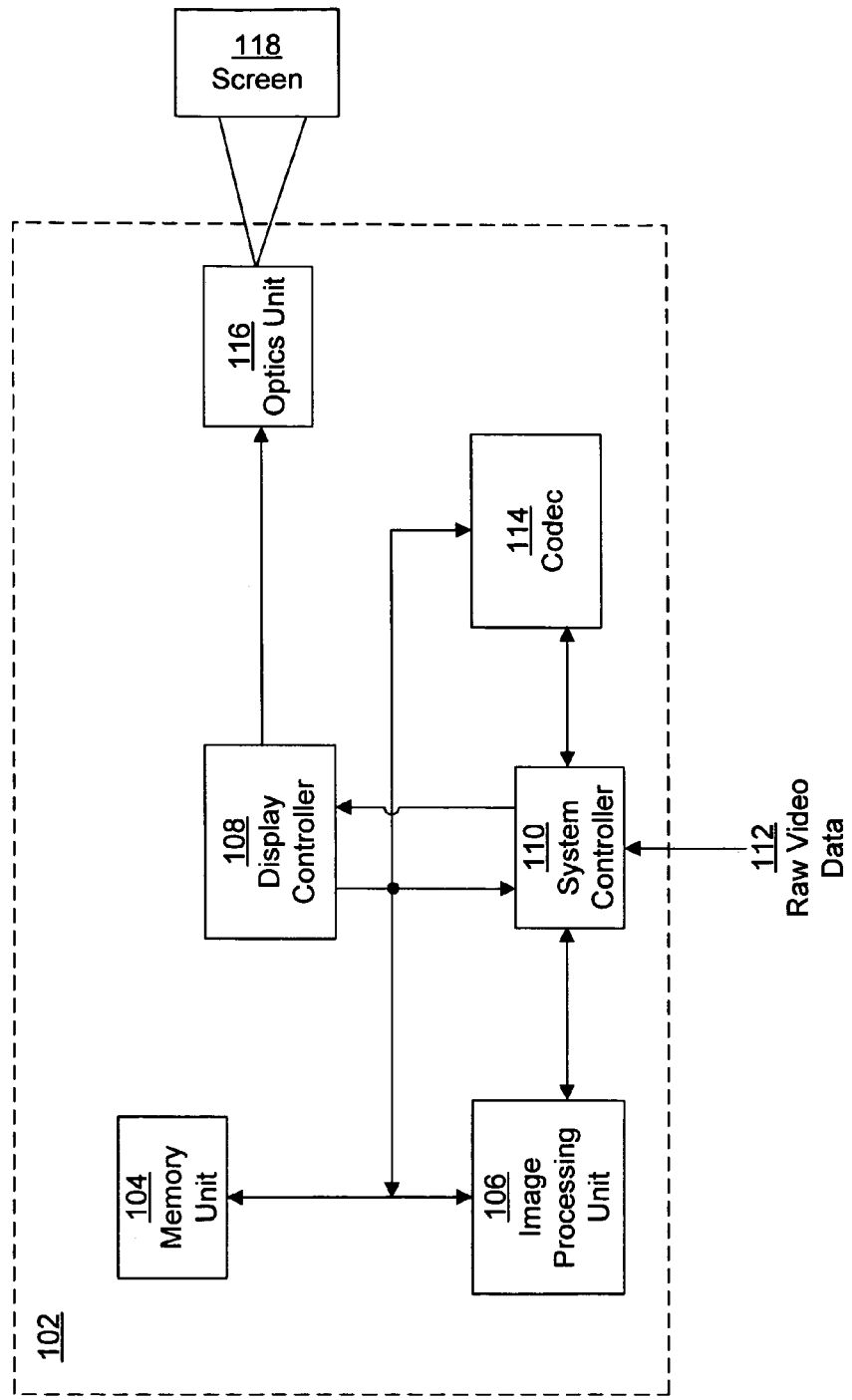
FIG. 1 is a block diagram of a conventional projector system.
Figure 2:
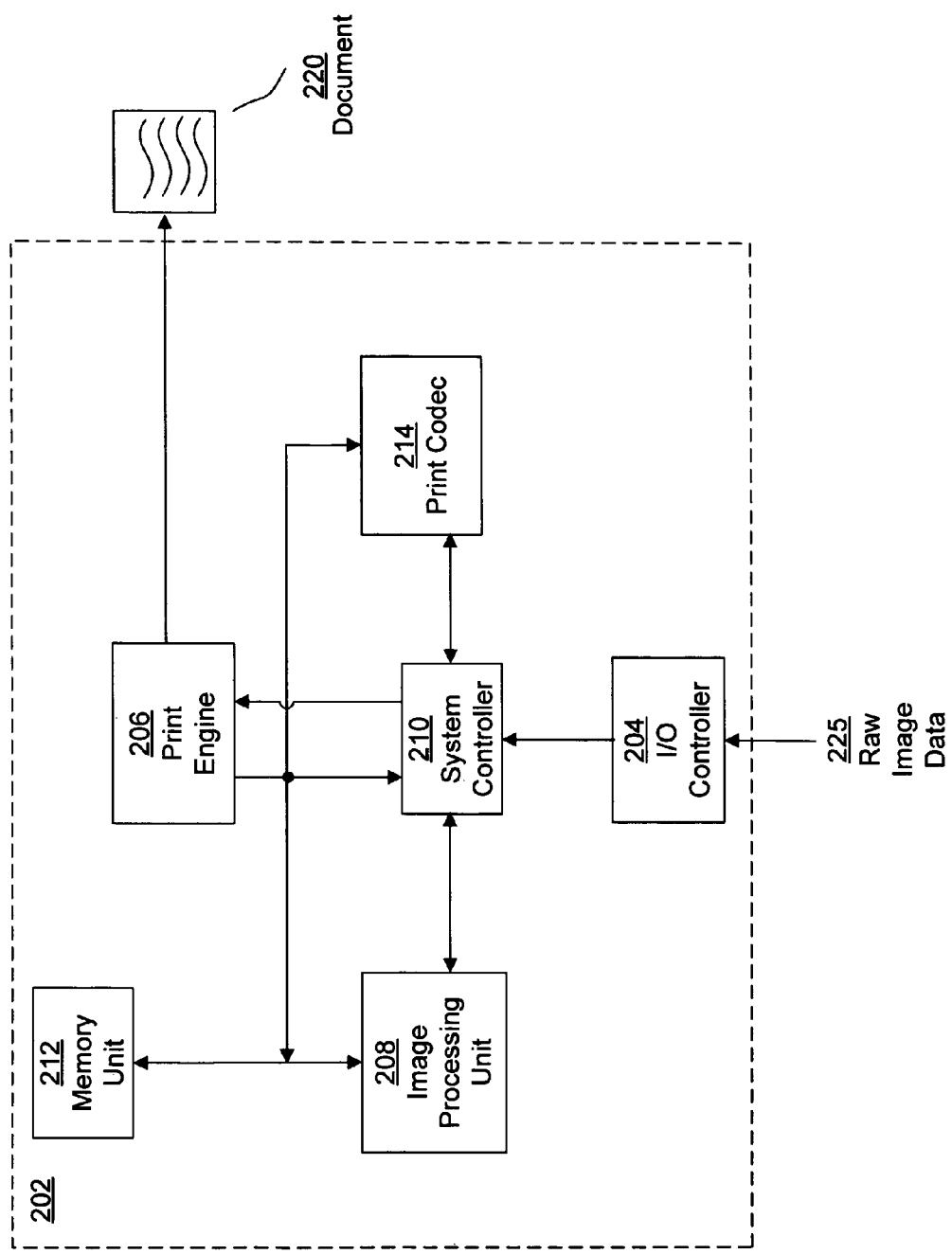
FIG. 2 is a block diagram of a conventional printer system.
Figure 3A:
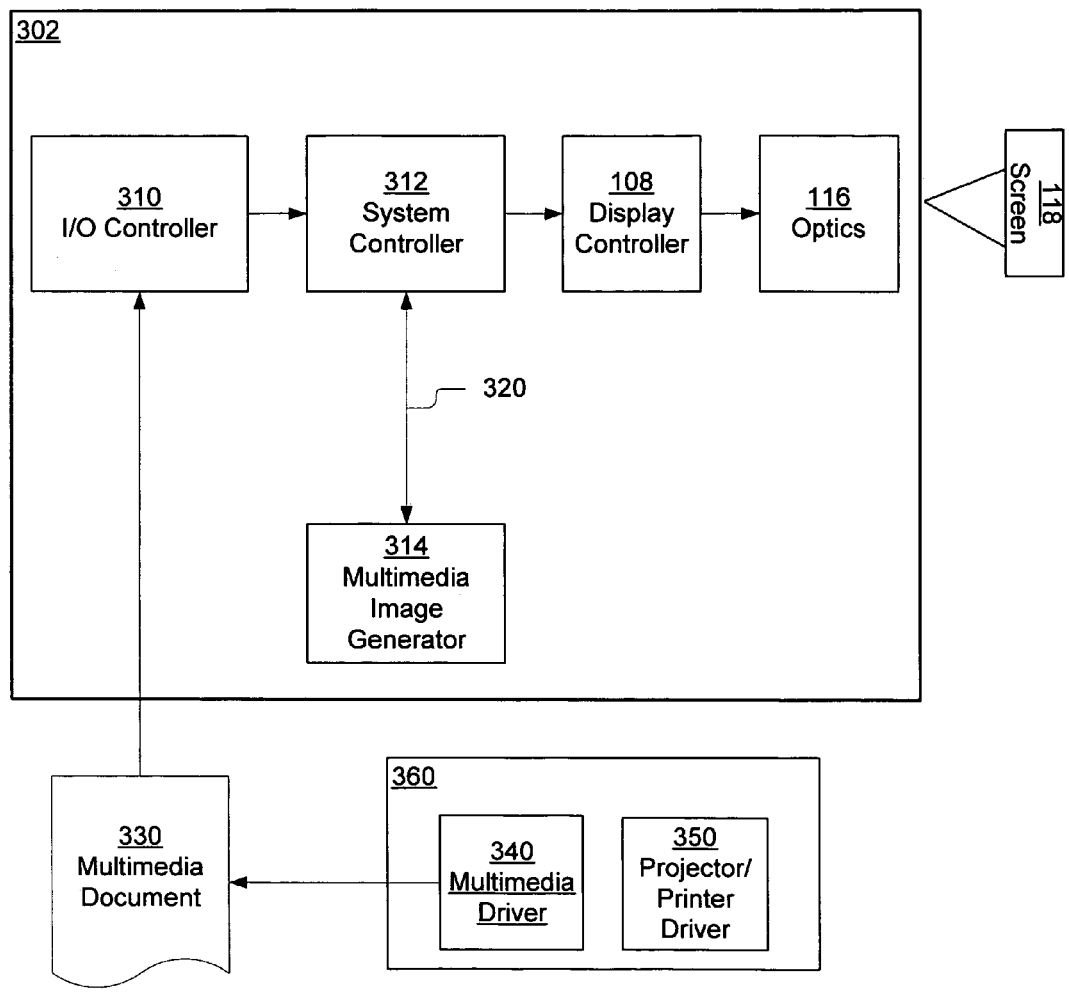
FIG. 3A is a block diagram of a projector system that displays multi-media documents in accordance with an embodiment of the present invention.

A digital projector (DP) system 300 for displaying a multimedia document 330, in accordance with an embodiment of the present invention, is shown in FIG. 3A. The digital projector system 300 preferably comprises a personal computer 360, containing at least a projector/printer driver 350 and a multimedia driver 340; and a projector 302 coupled to the personal computer 360. The projector 302 preferably comprises: an I/O controller 310 coupled to the personal computer 360; a multimedia image generator 314; a conventional display controller 108; a system controller 312 coupled to the I/O controller 310, the multimedia image generator 314 by way of signal line 320, and the display controller 108; and conventional optics 116 coupled to the display controller 108.

The digital projector system 300 is capable of receiving data in a variety of formats including multimedia documents that contain embedded instructions or codes in a special markup language, indicating the presence of multi-media content. Digital projector 300 provides "print-to-display" action for projecting multimedia documents on a digital projector by "printing" the documents similar to how a document is printed over a standard printer. Such functionality is fully disclosed in co-pending U.S. patent application Ser. No. 11/094,887 entitled "A Projector/Printer For Displaying Or Printing Of Documents," by Dar-Shyang Lee, Jonathan J. Hull, Bema Erol, and Jamey Graham, filed Mar. 30, 2005, which is incorporated herein by reference.

The two drivers 340, 350 are coupled to each other and located on a computing device such as a personal computer 360. These drivers 340, 350 initiate rendering of a document in a PDL and embed special tags for displaying multi-media components.

According to one embodiment, the projector/printer driver 350 takes data, renders the data in standard page description language (like postscript or PCL) to generate a standard document and sends the document to multimedia driver 340 for embedding multimedia content into and creating the multi-media document 330. When a particular presentation requires multi-media components to be displayed in conjunction with the PDL file, the multimedia driver 340 embeds special tags in the rendered PDL document containing instructions for fetching, formatting, and displaying multi-media components, like video, audio, or animation data, to form multimedia document 330. At this point, multimedia document 330 is ready to be transmitted through a local area network (LAN) or a parallel port connection to digital projector 302.

The I/O controller 310 preferably has a variety of connectors (not shown) such that multimedia document 330 can be sent to the digital projector 302 as parallel port data from a direct parallel connection with computing device 360; as network data received over a local-area-network (LAN) coupled by a network connection, wired or wireless; or as video data through a display connector like most conventional projector systems. Furthermore, a user can "print" a file to the digital projector system 300 over Bluetooth in yet another embodiment where the digital projector 302 includes a Bluetooth transceiver (not shown). I/O controller 310 supports a variety of data input formats through connection between a video input port, LAN input port, parallel input port, or any particular data port configured to accept any particular data format that a user chooses for display.

Once the particular multi-media document 330 is input to digital projector 302, by way of I/O controller 310, the document 330 is sent to the system controller 312 where the system controller 312 determines whether the incoming document 330 is in a compatible format for display by projector 302. In an embodiment, the system controller 312 is adapted to control the flow of data within digital projector 302 by receiving input data in a variety of formats (including video, print data or embedded multimedia) and outputting data to the appropriate modules of the multimedia image generator 314 for processing, conversion, or storage. In this embodiment, the system controller 312 also determines whether the incoming document 330 contains standard printer language with embedded multimedia that requires conversion to a data format suitable for projection. The system controller 312 unpacks the incoming multimedia document 330 and parses the content of multimedia document 330 into a PDL portion and a multimedia portion. The PDL portion of document 330 is sent to multi-media image generator 314 for data conversion to a format such as pixel and color data that can be provided to the display controller 108 to produce an image. Multi-media image generator 314 receives the PDL file and converts the file to a projectable format (like RGB or CYN data) that can be displayed through display controller 108 and optics 116 onto screen 118. The system controller 312 then interprets the remaining embedded instructions and codes such as in a special markup language within multimedia document 330 and these interpreted instructions and codes are delivered to the multi-media image generator 314 for processing. Multimedia data is fetched using the network, received, and formatted into a projectable format by multimedia image generator 314 and directed to display controller 108 and optics 116 for display onto screen 118.

Figure 3B:
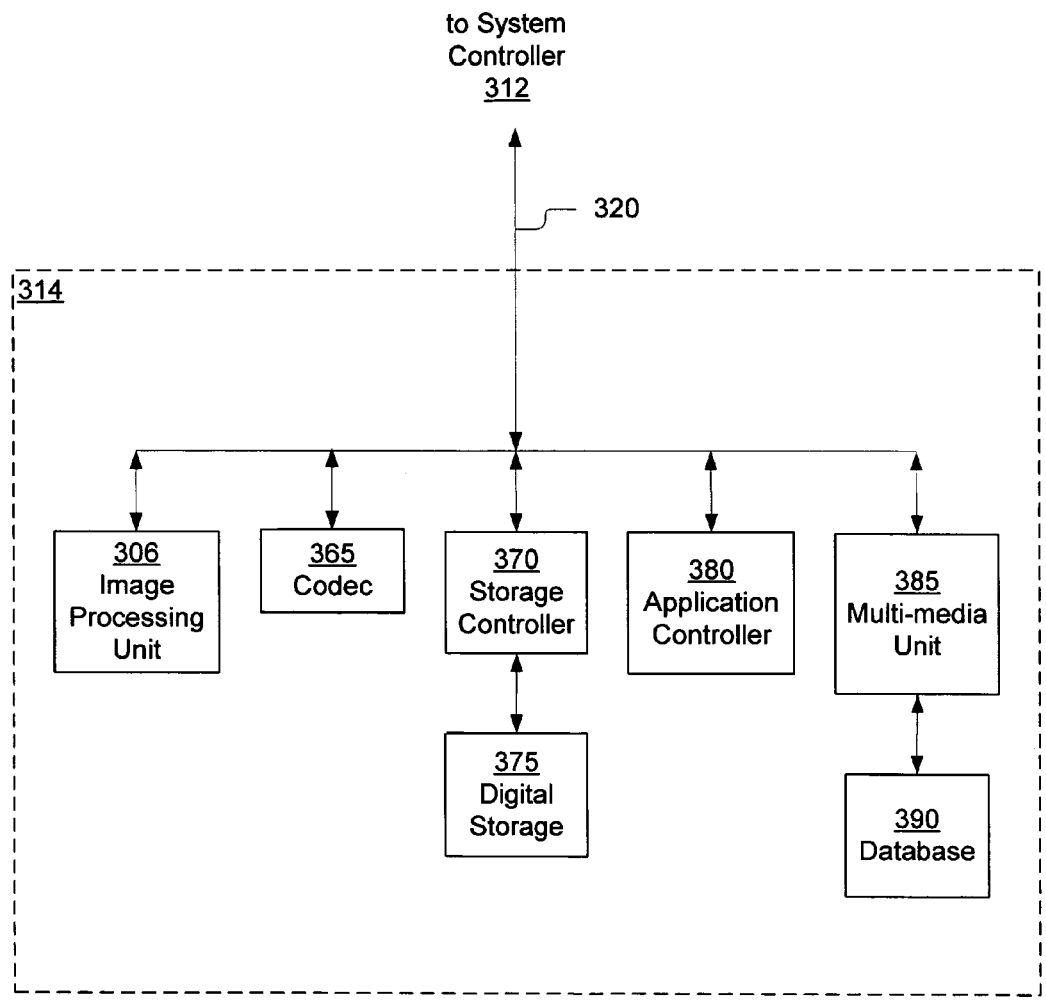
FIG. 3B is a block diagram of a multimedia image generator in accordance with an embodiment of the present invention.

The multimedia image generator 314 that renders multi-media documents for display is shown in more detail in FIG. 3B. Multimedia image generator 314 preferably receives PDL content and non-PDL content for conversion, fetching, processing, and/or storage. Multimedia image generator 314 preferably includes: an image processing unit 306; a codec 365; a storage controller 370 coupled to a digital storage 375; an application controller 380; and a multimedia unit 385 coupled to a database 390. Depending on the type and format of the incoming data, the system controller 312 determines which of these components, within the multimedia image generator 314, receives the incoming data. System controller 312 communicates with each component by way of signal line 320. The multimedia image generator 314 of the present invention is advantageously able to receive an input file in a variety of different formats and convert that input file into pixel and color data that can be sent to the display controller 108 to generate a displayable image.

In one embodiment, the image-processing unit 306 receives video data and converts that data to pixel and color data. The image-processing unit 306 is coupled to the signal line 320 and is capable of receiving data from the codec 365, the digital storage 375 via storage controller 370, or database 390 via multimedia unit 385. The image-processing unit 306 also provides the pixel and color data to the display controller 108 via the system controller 312.

The storage controller 370 and digital storage 375 handle storage of input data, partially converted data, or processed pixel and color data. The storage controller 370 orchestrates storage of multiple multi-media files based on the order in which the I/O controller 310 receives the incoming data. The storage controller 370 accesses the temporary digital storage 375 to allow the digital projector 302 to receive data faster than it can be rendered, thus allowing the digital projector 302 to perform other tasks while the display of images continues.

The codec 365 has an input and an output coupled to line 320 to receive input data and output data. The codec 365 is configurable and capable of performing compression, decompression, encoding and decoding. The codec 365 is responsive to the application controller 380 and the system controller 312 as will be described in more detail below.

The application controller 380 is also coupled to line 320 for communication with the system controller 312, the codec 365, the image processing unit 306 and the storage controller 370. The application controller 380 controls the storage and conversion of files in a print format into video data format. As will be described in more detail below, the application controller 380 controls the codec 365, including identifying what type of coding or decoding to use to convert an input print file to a video data format. Such conversion includes running applications necessary to translate and interpret the print file format.

The multimedia unit 385 receives embedded instructions and codes that have been extracted from the non-PDL portion of the file. In one embodiment, the non-PDL portion of the file is the comments fields/part of a conventional PDL file. Within the comments, the present invention inserted instructions and codes pertaining to multimedia content associated with a particular data in the file. These embedded instructions and codes are sent from the system controller 312 to the multi-media unit 385 over signal line 320. Depending on the particular instructions and codes received, multimedia unit 385 performs the corresponding action such that the specific multi-media content can be located over a network coupled to the projector 302 and displayed appropriately with respect to the PDL portion of document 330. For example, multimedia unit 385 can advantageously interpret an Internet address embedded within a comment field associated with the special markup language indicating where multimedia content is remotely stored. Multimedia unit 385 can then establish a communications link between projector 302 and the Internet address such that multimedia content can be imported and stored locally in a database 390. Multimedia unit 385 sends multimedia content stored in database 390 to codec 365 for conversion or to image processing unit 306 for appropriate display and print formatting.

The system controller 312 identifies the multimedia document 330 as a document in page description language and having special codes or instructions embedded in the comments of the document. For example, this identification could be based on the port of the I/O controller 310 that received the multimedia document. Alternatively, the identification could be from identification of the document format or header information. In this embodiment, the system controller 312 receives the multimedia document and parses the document into a PDL portion and a non-PDL portion. The system controller 312 sends the PDL data to application controller 380 of the multimedia image generator 314 for appropriate data conversion. The system controller 312 also interprets the embedded codes and instructions, for example in a special markup language, within the multimedia document 330 and sends the interpreted instructions and codes to multimedia unit 385 for appropriate fetching and storage of multimedia content.

The application controller 380 receives the PDL portion of multimedia document 330 and sends translation instructions to codec 365 such that codec 365 can successfully carry out a PDL to video data conversion. The particular translation instructions sent from the application controller 380 to codec 365 depends on the exact form of the incoming PDL data. Different PDL data formats (i.e. postscript or PCL) have different translation instructions as will be recognized by those skilled in the art. During the conversion step, the incoming PDL data is converted to a data file suitable for further manipulation by the image-processing unit 306 to generate an image displayable by digital projector 302. Typical data display formats include, but are not limited to RGB and CYN data. Once the PDL data is converted successfully to a projectable format, the converted data is ready for processing and display.

In one embodiment, multimedia unit 385 receives interpreted instructions, embedded in multimedia document 330, from system controller 312 for fetching multimedia data over the Internet. The multimedia unit 385 establishes a communications link with the interpreted Internet address, as described above, and retrieves multimedia data by way of a LAN or wireless connection. Once the multimedia data has been retrieved, multimedia unit 385 sends the multimedia components to image-processing unit 306 for appropriate formatting and then to display controller 108 and optics 116 for display. In some cases, certain multi-media components are stored in database 390 while other components are fetched by multimedia unit 385 and displayed through optics 116. Storing fetched multimedia components within temporary storage database 390 allows digital projector 302 to maintain correct timing of the presentation, as dictated by the special markup language within document 330, while other tasks are being carried out in the background.

Figure 5:
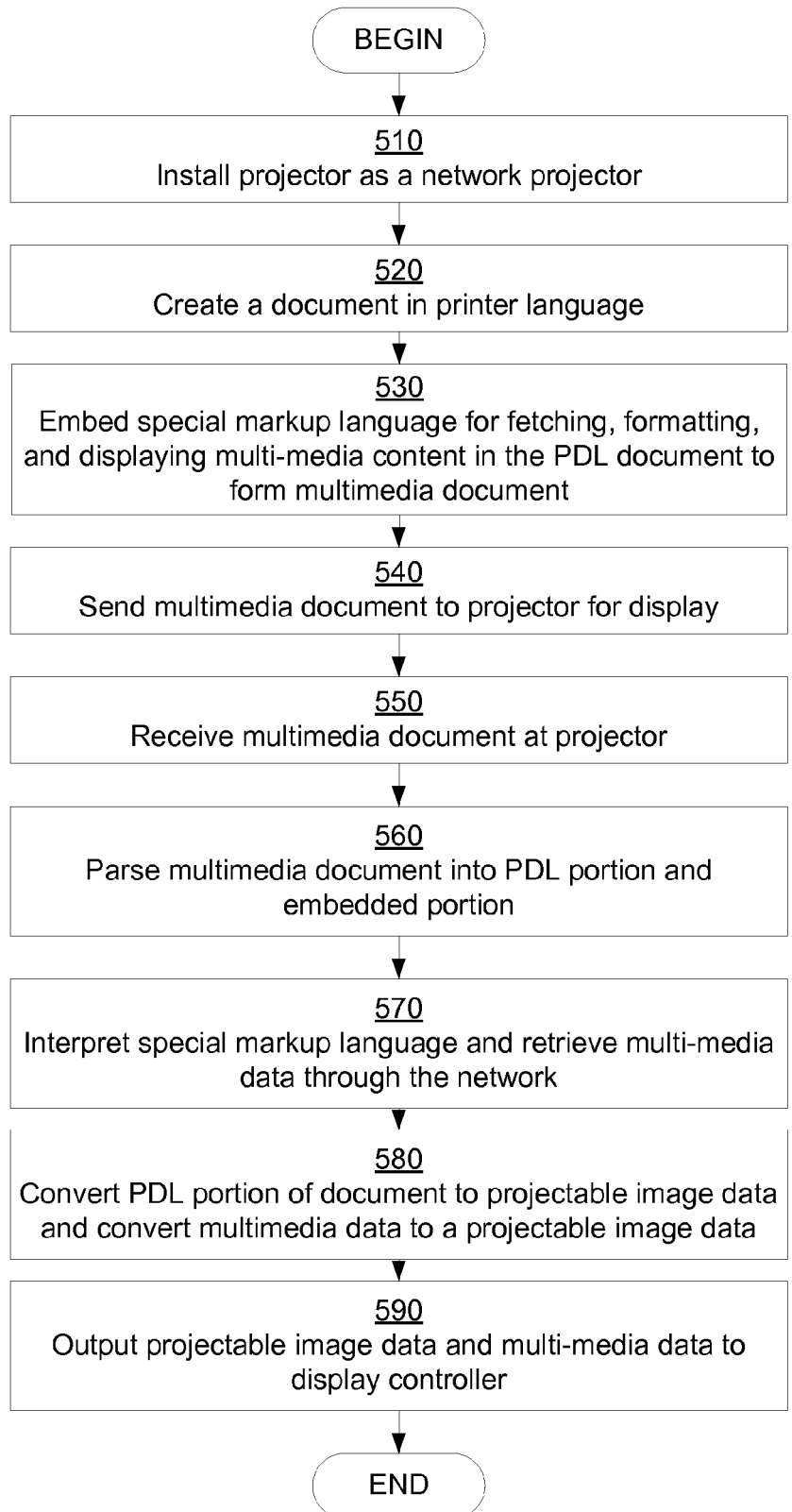
FIG. 5 is a method for displaying a multi-media document in accordance with an embodiment of the present invention.

FIG. 5 is a flow diagram that illustrates a method for displaying a multimedia document, according to an embodiment of the present invention. Initially, projector 302 is installed 510 as a network device so that it is capable of receiving multimedia documents. Projector/printer driver 350 creates 520 a document in page description language or some other language recognizable to the projector 302, and projector/printer driver 350 sends the PDL document to multimedia driver 340 to embed 530 special instructions and codes such as in a markup language for fetching, formatting, and displaying multimedia content in the PDL document to form a multimedia document 330. It should be understood that the instructions and codes are embedded in the comments of the PDL, and can include: instructions for controlling the operating parameters of the projector 302; video, audio or animation data that can be converted by the multimedia image generator 314 for display on the projector 302; instructions, addresses, and display parameters for downloading video, audio or animation data from the network and displaying it on the projector 302, or any other function that can be performed by the system controller 312. Such operating parameters of the projector 302 include control functions such as the particular display resolution, display sequence, color, aspect ratio, etc. desired by the user for the particular multimedia document being displayed. The multimedia document 330 is then sent 540, by way of a network or parallel data connection, to projector 302 for display. Projector 302 receives 550 the multimedia document 330 at I/O controller 310 and parses 560 the document 330 into a PDL portion and an embedded or special markup portion with system controller 312. In the case, where they are only control codes in the embedded portion, the system controller 312 extracts 570 and processes them. System controller 312 interprets 570 the special markup language and sends the interpreted instructions and codes to multimedia unit 385 to perform the particular actions required by them. In one embodiment, no conversion is necessary the embedded data is in a format displayable by the projector 302. In another embodiment, the multimedia unit 385 converts 580 the multimedia data in the embedded portion to a format suitable for the display controller 108. In yet another embodiment, the data for display may be retrieved from a location on the network or from the database 390 using information in the embedded portion, and the multimedia unit 385 could also convert such downloaded data for display. System controller 312 also sends the PDL portion of multimedia document 330 to multimedia image generator 314 where the PDL data is converted 580 to a format suitable for display. If necessary the multimedia data derived from the embedded portion is also converted 580 to a format suitable for display. The projectable image data and multimedia data retrieved from the special markup language are then sent to image processing unit 306 for proper formatting and output 590 to display controller 108 for display.

Figure 3C:
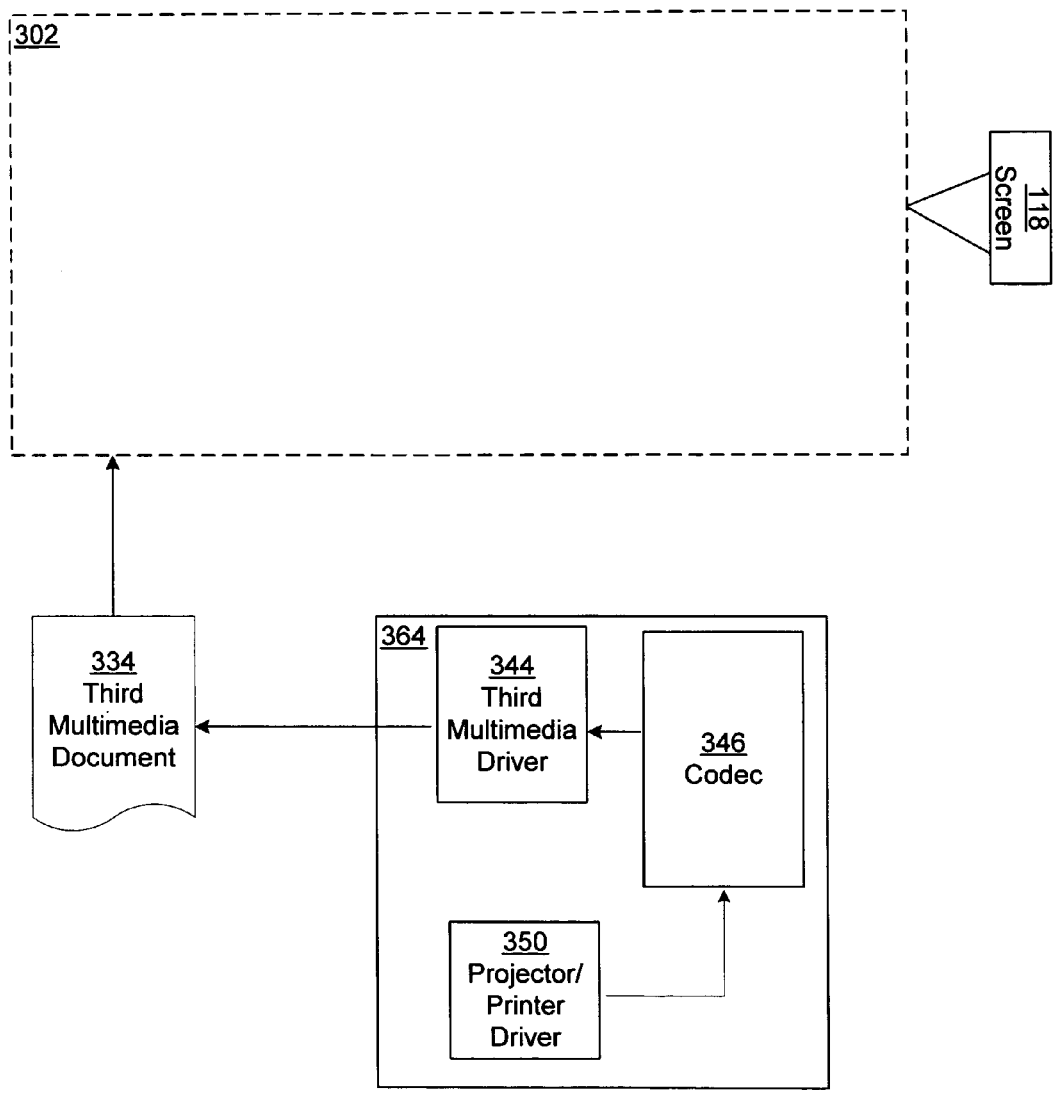
FIG. 3C is a block diagram of a projector system that displays multimedia documents, in accordance with another embodiment of the present invention.
Figure 6:
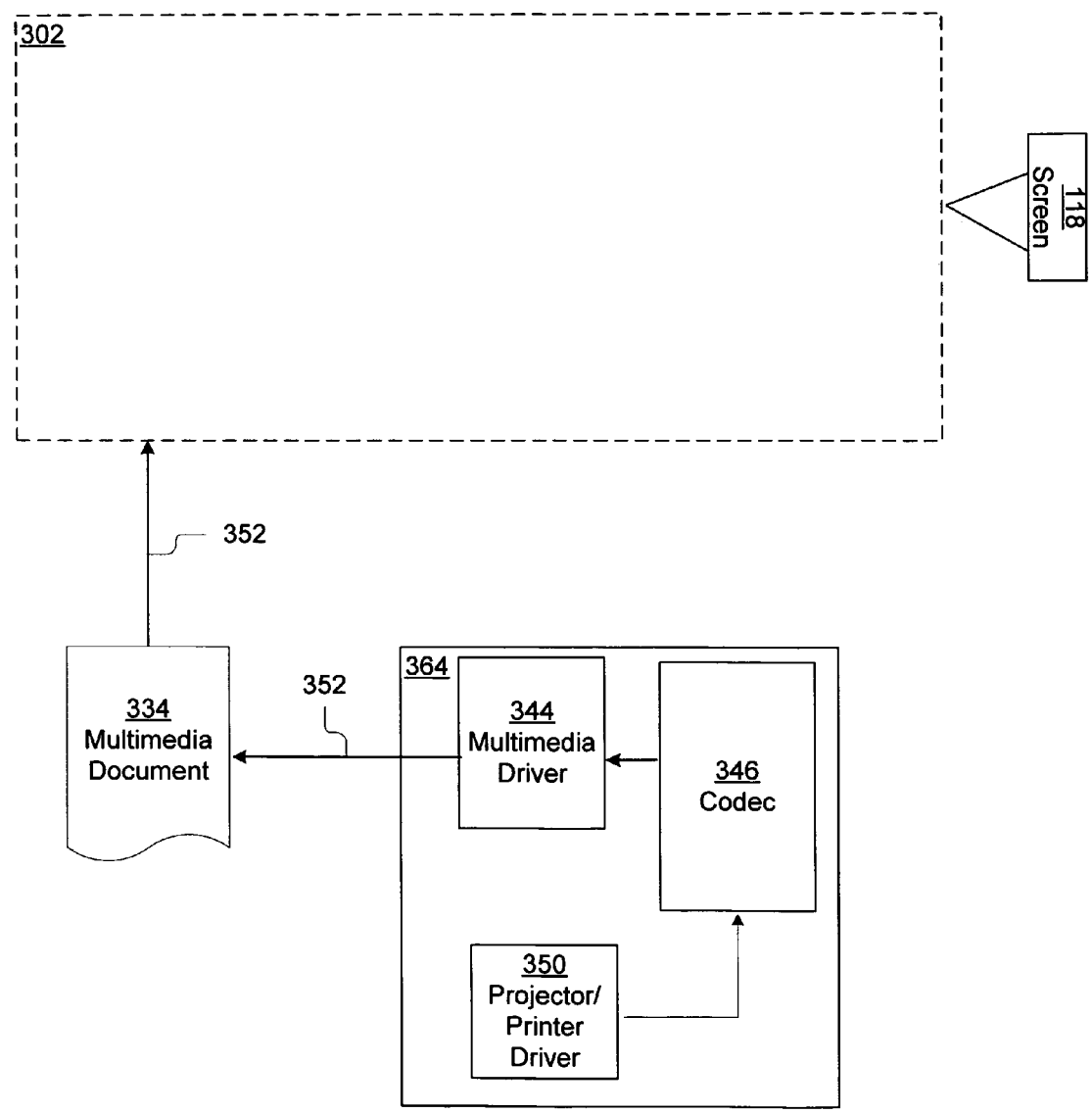
FIG. 6 is a block diagram of a projector system that displays multimedia documents, in accordance with another embodiment of the present invention.

An embodiment of a system 307 for displaying multimedia documents independent of the software that created the document is shown in FIG. 6 and with reference to FIG. 3C. System 307 preferably includes a personal computer 364 coupled to the projector 302 of the present invention. Personal computer 364 preferably includes a standard projector/printer driver 350, as described above, coupled to a multimedia conversion codec 346 coupled to a multimedia driver 344. Personal computer 364 is communicatively coupled to projector 302 by way of a direct parallel port connection or a LAN connection 352.

The multimedia conversion codec 346 has an input and an output coupled to receive input data and output data. The codec 346 is configurable and capable of performing compression, decompression, and encoding and decoding signals. The codec 346 is responsive to the projector/printer driver 350. Multimedia conversion codec 346 is capable of receiving a presentation document from projector/printer driver 350, converting presentation documents (like Microsoft PowerPoint) into standard video data (i.e. RGB, CYN), and outputting the video data to the driver 344.

Figure 7:
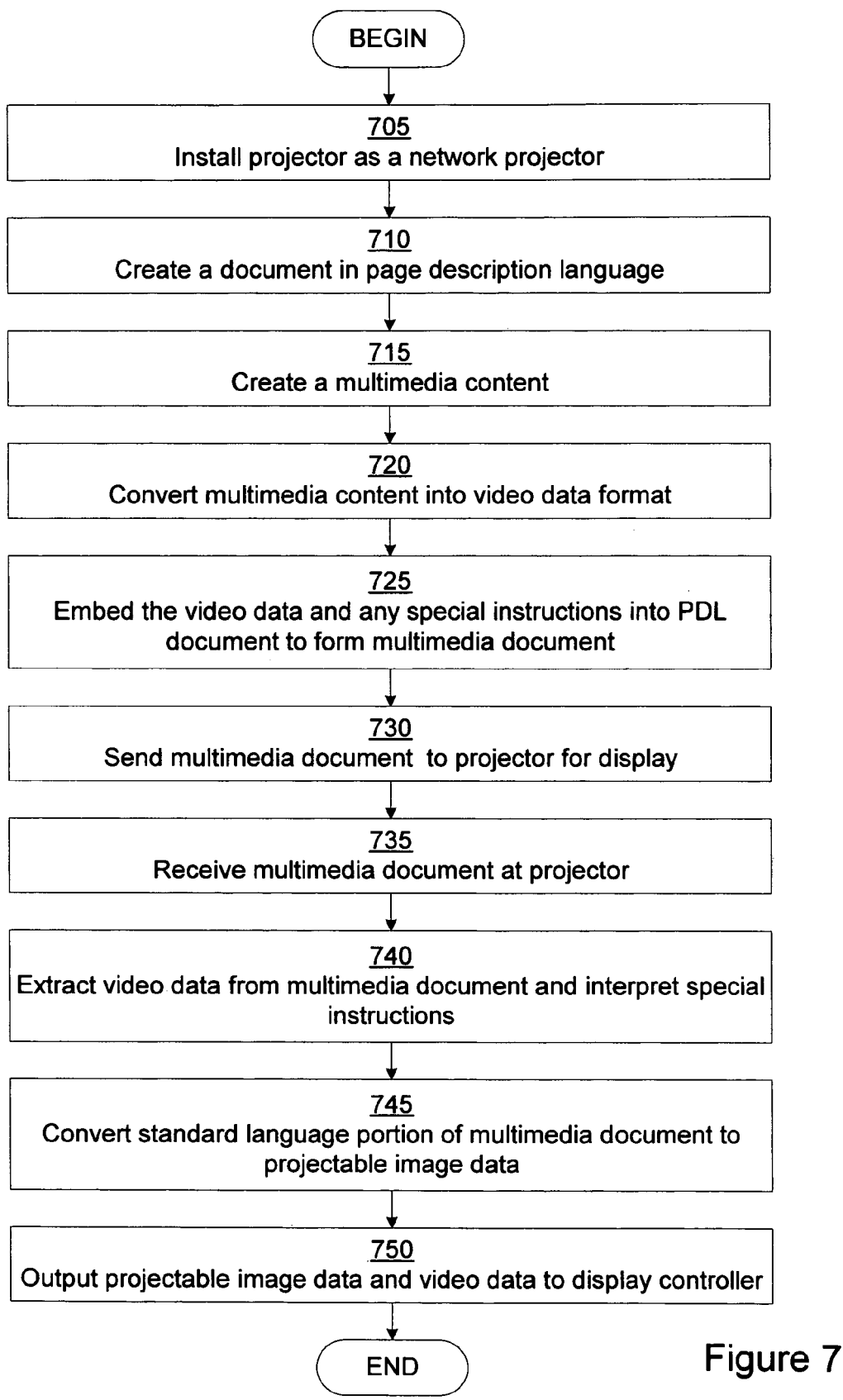
FIG. 7 is a flow diagram that illustrates a method for displaying a multi-media document in accordance with a third embodiment of the present invention.

A method for displaying multimedia documents independent of the software that created the document is shown in FIG. 7. Initially, projector 302 is installed 705 as a network or local projector 302 for receiving multimedia documents to be displayed. Projector/printer driver 350 creates 710 a document in page description language (PDL document) and creates 715 multimedia content such as animation, live video or audio. Multimedia conversion codec 346 receives the multimedia content and converts 720 the presentation document into video data format usable by the projector 302. The multimedia driver 344 embeds 725 the video data along with any special display instructions into the PDL document to form the multimedia document 334 and sends 730 the multimedia document 334 to projector 302 for display. I/O controller 310 receives 735 the multimedia document 344 and directs the multimedia document 344 to the system controller 312 where the video data is extracted 740 from the multimedia document 344. System controller 312 sends the PDL portion of multimedia document 334 to multimedia image generator 314 where the PDL portion of the multimedia document 344 is converted 745 to a projectable image format by multimedia image generator 314. Both the projectable image data and the video data are output 750 to the display controller 108 for display.

Figure 4:
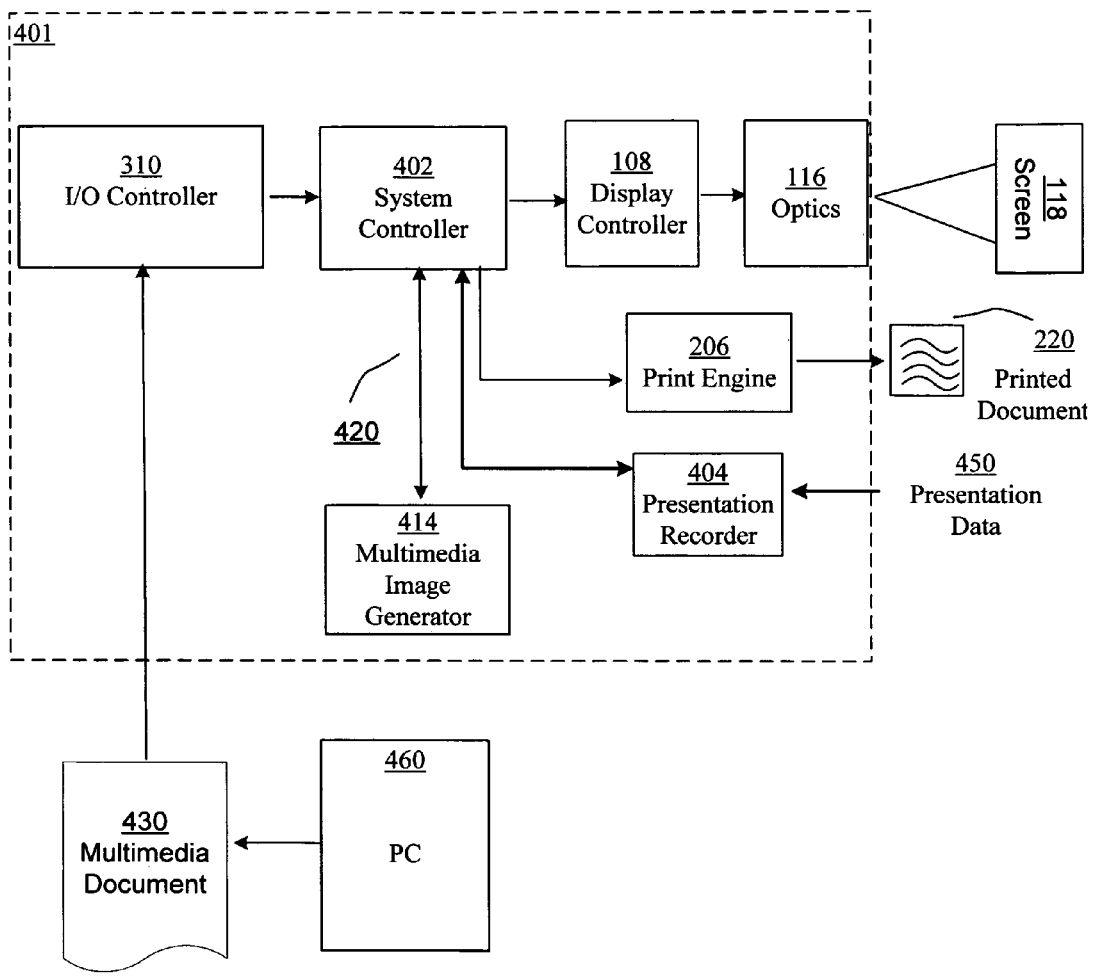
FIG. 4 is a block diagram of a projector/printer system that displays, prints, and/or records multi-media documents, in accordance with an embodiment of the present invention.

A block diagram of an embodiment of a digital projector/printer system 400 is shown in FIG. 4. Digital projector/printer module 401 is capable of at least five processes: 1) projecting a display of an incoming multimedia document; 2) printing an incoming multimedia document; 3) recording a multimedia presentation; 4) storing multimedia document for later use; or 5) associating a multimedia document with a presentation. Process 1) is carried out in a similar fashion to the process described above in relation to FIGS. 3A-D and 5-7. The process for projecting a multimedia file regardless of input format has been described above and similar structure and functionality are provided in the digital projector/printer 401 as has been described above for the projector 302. However, the operation (processes 2-4) of printing and recording require additional structure and functionality, and the processes will be described below.

As shown in FIG. 4, the digital projector/printer 401 preferably comprises: an I/O controller 310, a multimedia image generator 414, a system controller 402 coupled to the I/O controller 310 and to the multimedia image generator 414 via signal line 420; a display controller 108 coupled to the system controller 402; optics 116 coupled to the display controller 108; a print engine 206 coupled to the system controller 402; and a presentation recorder 404 coupled to the system controller 402. Some of the components of the digital projector/printer 401 have similar function and form as has been described above with reference to FIGS. 3A and 3B, so like reference numerals and terminology have been used to indicate similar functionality. For example, the I/O controller 310, the display controller 108, and the optics 116 are similar to that described above with reference to FIGS. 3A and 3B, so they will not be described again at this time.

The system controller 402 is similar to that described above, however, it includes the added functionality for the operations noted above, specifically: 1) projecting a display of an incoming multimedia file embedded with special markup language; 2) projecting a display of an incoming multimedia file embedded with video data; 3) printing an incoming multimedia file embedded with special markup language; 4) printing an incoming multimedia file embedded with video data; and 5) recording a presentation. The system controller 402 is adapted to control the flow of data within digital projector/printer 401 by receiving input data in a variety of formats (including multimedia, video, or print data) from I/O controller 310 and outputting data to the appropriate modules for processing, conversion, display, printing, recording, or storage. The system controller 402 is coupled to send and receive data and control signals to the multimedia image generator 414 and the presentation recorder 404. The system controller 402 is coupled to send data and control signals to the print engine 206 and the display controller 108.

The multimedia image generator 414 is similar to that described above, however, the multimedia image generator 414 for the projector/printer 401 embodiment of the present invention also includes functionality to output the file in print format to the print engine 206 for printing or a format suitable for the presentation recorder 404. The multimedia image generator 414 includes the image processing module 306, the codec 365, the storage controller 370, the digital storage 375, the application controller 380, multimedia unit 385, and database 390, coupled by signal line 420, as has been described above. Depending on the type and format of the incoming data, the system controller 402 determines which of these components of the multimedia image generator 414 receive the incoming data. The multimedia image generator 414 of the present invention is advantageously able to receive an input file in a variety of different formats, and convert that input file into pixel and color data that can be sent to the display controller 108 to generate a displayable image or convert the input file into control and print data that can be provided to the print engine 206 for generating a document. Different modules of the multimedia image generator 414 are used to manipulate the input file depending on its input format and the desired output. Multimedia image generator 414 preferably receives PDL files, non-PDL files, and interpreted comments embedded within a PDL file for conversion, fetching, processing, and/or storage.

In one mode, the image processing module 306 receives video data and converts that data to pixel and color data. In another mode, the image processing module 306 receives print data (i.e. PDL or PDL data) and converts it to data and control signals understood by the print engine 206. The image processing module 306 is coupled to the signal line 420 and is capable of receiving data from the codec 365 or the digital storage 375 via the storage controller 370 or the database 390 via the multimedia unit 385. The image processing unit 306 is also coupled to the system controller 402.

The codec 365, of multimedia image generator 414, is capable of additional functionality. The codec 365 has an input and an output coupled to line 420 to receive input data and output data. The codec 365 is configurable and capable of performing compression, decompression, and encoding and decoding signals. In an embodiment, the codec 365 is responsive to application controller 380 and multimedia unit 385 such that codec 365 is advantageously adapted to receive data of any particular format and convert the data to a variety of output formats. In particular, codec 365 is adapted to perform at least the following conversions: 1) a page description language to video data conversion and 2) a video data to page description language conversion.

The storage controller 370 and digital storage 375 handle storage of input data, partially converted data, or processed pixel and color data, or processed print and control data. The storage controller 370 is capable of storing multiple files based on the order in which the I/O controller 310 receives the incoming data. Storage controller 370 accesses the temporary digital storage 375 to allow the projector/printer 401 to receive data faster than it can be rendered, thus allowing it and other devices coupled to it to perform other tasks while the display or printing of images continues.

The application controller 380 is also coupled to line 420 for communication with the system controller 402, the codec 365, the image processing module 306 and the storage controller 370. The application controller 380 controls 1) the storage and conversion of files from a print format into video data format, 2) the storage and conversion of files from a video format into print format, and 3) conversion to and from a meeting recorder format. As will be described in more detail below, the application controller 380 controls the codec 365 including identifying what type of coding or decoding to use to convert an input file to a output data format, whether it be print or video format. Such conversion includes running applications necessary to translate and interpret the print and video file formats.

The multimedia unit 385 receives embedded portion of a multimedia document 403 pertaining to multimedia content associated with the multimedia file from system controller 402, by way of signal line 420. Depending on the particular comment received, multimedia unit 385 performs the corresponding action such that the particular multi-media content can be located over the network and displayed appropriately with respect to the PDL portion of document 330. For example, multimedia unit 385 advantageously interprets an Internet address where multimedia content is stored remotely, embedded within a comment associated with the special markup language. Multimedia unit 385 then establishes a communications link between projector 302 and the Internet address such that multimedia content can be imported and stored locally in database 390. Multimedia unit 385 sends multimedia content stored in database 390 to codec 365 for conversion or to image processing unit 306 for appropriate display and print formatting.

The print engine 206 can be any one of a conventional type, and using input and control signals from the system controller 402 generates a document 220 that may be printed text, drawings or images. The print engine 206 has an input coupled to the system controller 402 to receive data and commands. The system controller 402 preferably provides the information and data in a format understood by the print engine 206 such as PDL, PCL, postscript or other similar printer language.

In an embodiment, the system controller 402 determines whether the incoming document 430 contains standard printer language that requires conversion to a data format suitable for projection. System controller 402 unpacks the incoming multimedia document 430 and parses the content of multimedia document 430 such that the PDL portion of document 430 is sent to multimedia image generator 414 for data conversion to a format such as pixel and color data that can be provided to the display controller 108 to produce an image.

In an embodiment, projector/printer system 400 is capable of receiving multimedia documents in the form of network data or parallel port data (through PC 460) at the corresponding input port of I/O controller 310 and printing them. The output port of I/O controller 310 directs the multimedia document 430 to system controller 402 where the system controller parses the incoming multimedia document 430 and sends the PDL portion of document 430 to image processing unit 306 and/or storage controller 370. If the system controller 402 encounters special tags corresponding to multimedia components, embedded within document 430, system controller 402 interprets the embedded comment and directs the interpreted comment to multimedia unit 385, located within multimedia image generator 414, for retrieval of the multimedia components. Once the multi-media components have been retrieved, as described above, multimedia unit 385 determines the sequence of when the components are to be sent to print engine 206 for printing such that the original sequence of PDL elements and non-PDL elements within multimedia document 430 are retained in printed document 220.

In yet an embodiment, the projector/printer 401 is equipped with a presentation recorder 404 for capturing presentation data 450. The presentation recorder 404 is part of a larger system for recording meeting and presentations. Presentation data 450, such as from cameras, microphones; and other capture devices as well as from a server (not shown) may be input to the presentation recorder of the projector/printer 401. This data under direction and control of the system controller 402 and input from the user may be displayed, printed or later recalled by the projector/printer 401.

The system controller 402 may store a displayed image to the presentation recorder 404 as well for recording a meeting that previously used the projector/printer 401. An exemplary presentation recorder 404 that could be incorporated as part of the present invention is disclosed in U.S. patent application Ser. No. 09/728,560, filed Nov. 30, 2000, titled "Techniques for Capturing Information During Multimedia Presentations," by Jonathan Hull, Michael Baxter, Pamela Gage, Jamey Graham, Dar-Shyang Lee, and Peter Hart, which is incorporated by reference herein. The format of presentation data 450 can include at least video, audio, or print media. Presentation recorder 404 allows a user to simultaneously project a presentation and also record the presentation for later use or editing. The video recording portion of presentation recorder also allows for recording of a completely interactive presentation through capture of audience reaction, feedback, or questioning. Also, in an embodiment, presentation recorder 450 is equipped with a digital scanner to receive incoming print media for editing and printing the print media.

A method 1000, for processing the multimedia document 430 by digital projector/printer system 400 is described in flow diagrams 10A-10G. Initially, multimedia document is received 1005 at the I/O controller 312 and the I/O controller 312 directs the incoming multimedia document 430 to system controller 402 to determine 1010 whether the incoming multimedia document contains an embedded portion such as in a special markup language. If the multimedia data contains an embedded portion, the process continues in step 1011 as shown in FIG. 10E. If the multimedia document does not contain special markup language, it is presumed the document contains only print data, and the process continues in step 1030 of FIG. 10A, as will be described with reference to FIGS. 10A-10D.

FIGS. 10A and 10B-D are flow diagrams that describe modes of operating the present invention for the case when incoming data is determined 1010 to contain only PDL data and no embedded portion. If the system controller 402 determines 1030 the command associated with the input data is the display command, the method transitions to step 1032 of FIG. 10B. In step 1032, the system controller 402 sends the PDL data to the multimedia image generator 414 to convert 1032 the PDL data from standard printer language to a projectable image data format. The system controller 402 then provides the projectable image data to the display controller 108 and optics 116 for display 1034 onto screen 118.

If the system controller 402 determines 1030 the command associated with the input data is not the display command, the method continues in step 1050 to determine whether the command associated with the data is the store for later use command. If so, the method stores 1055 the data in system memory and the process is complete and ends. For example, the system controller 402 sends the PDL data to storage controller 370 and digital storage 375 such that the PDL data is stored 1055 for later use. Once the storage is complete, the process ends.

If the system controller 402 determines 1050 the command associated with the input data is not the store for later use command, the method continues in step 1070 to determine whether the command associated with the data is the print PDL data command. If so, the method transitions to FIG. 10C and provides 1072 the PDL data to the print engine 206, prints 1074 the data, and the process is complete and ends. For example, the system controller 402 provides 1072 PDL data to the print engine 206 and the print engine 206 prints 1074 the PDL data as document 220.

If the system controller 402 determines 1070 the command associated with the input data is not the print PDL data command, the method continues in step 1090 to determine whether the command associated with the data is the associate PDL data with presentation command. If so, the method transitions to step 1092 of FIG. 10D to associate the PDL data with a presentation. For example, the system controller 402 determines 1092 which presentation is being presented. The system controller 402 then determines 1094 the particular PDL data currently being referenced and copies 1096 the PDL data currently being referenced such that a copy of the PDL data is stored in a data structure associated with the presentation. To insure proper association between the PDL data and the presentation, the system controller 402 stores 1098 a time and context index to the presentation in the data structure in digital storage 375. Once the association is complete the process ends.

If the system controller 402 determines 1090 the command associated with the input data is not to associate the PDL data with a presentation command, the process is complete.

Figure 10A:
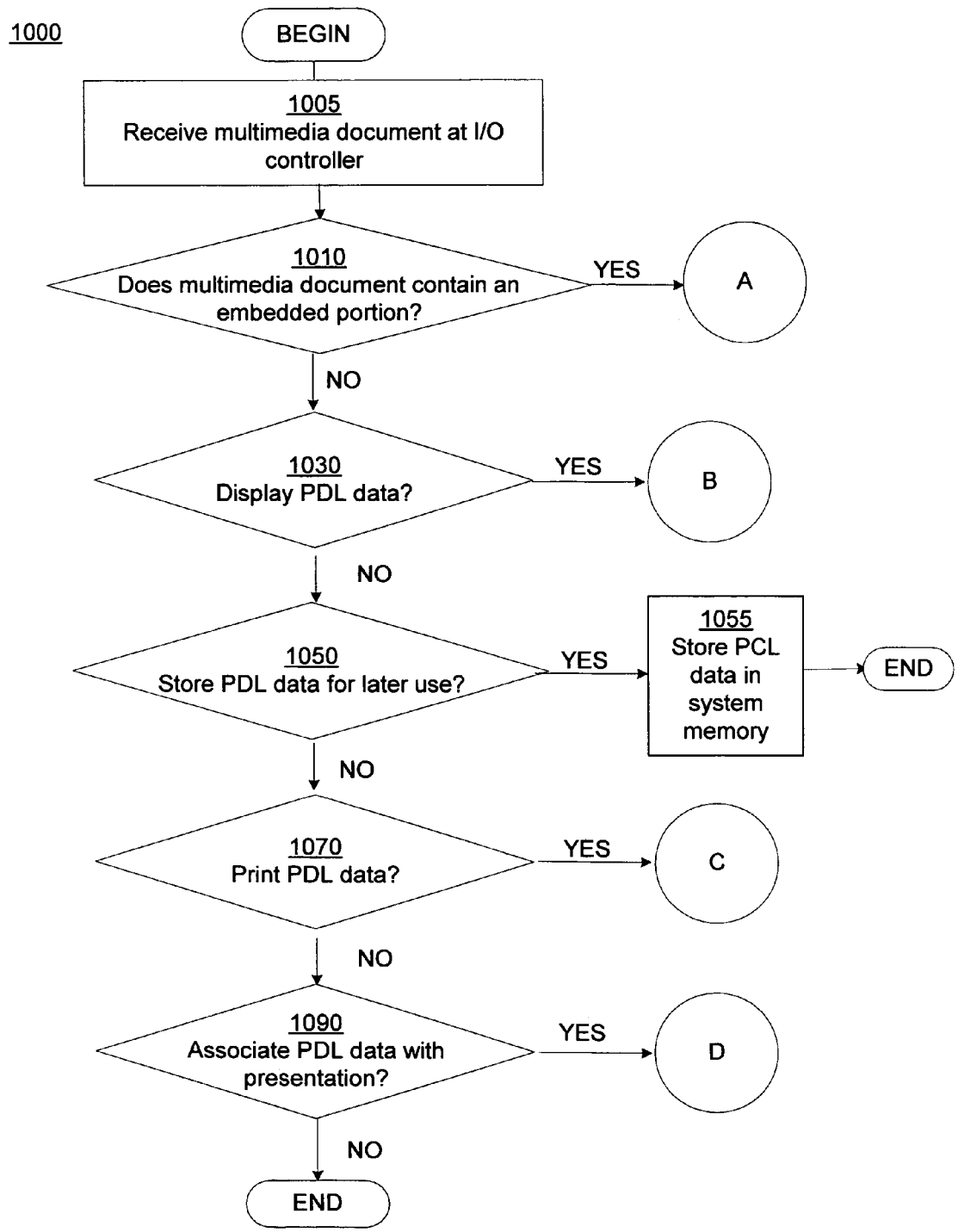
FIGS. 10A-G are flow diagrams that illustrate a method for processing a multimedia document by a projector/printer in accordance with an embodiment of the present invention.
Figure 10B:
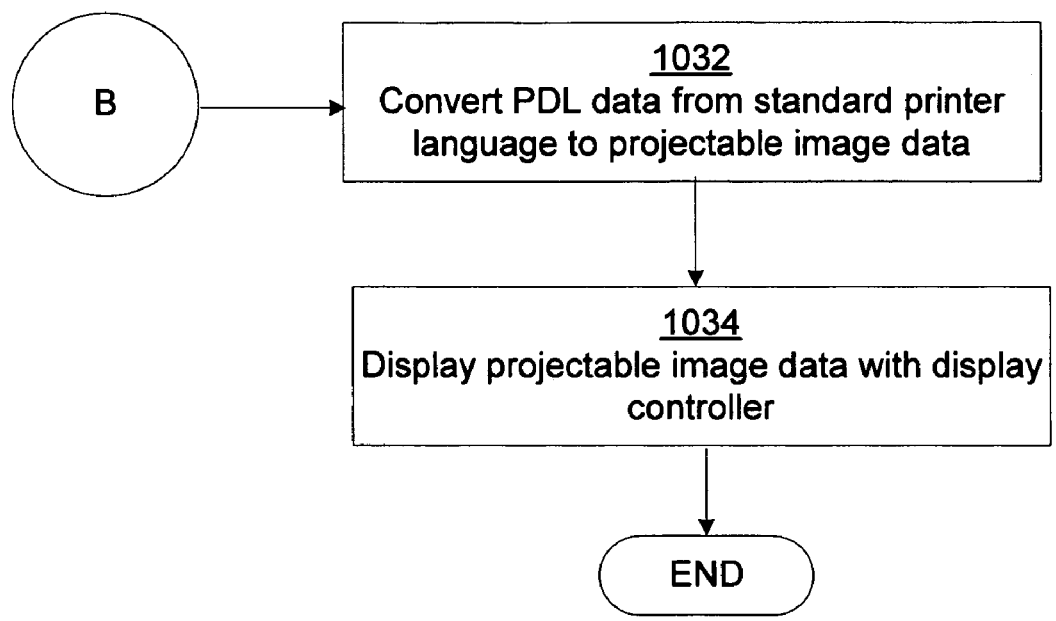
Figure 10C:
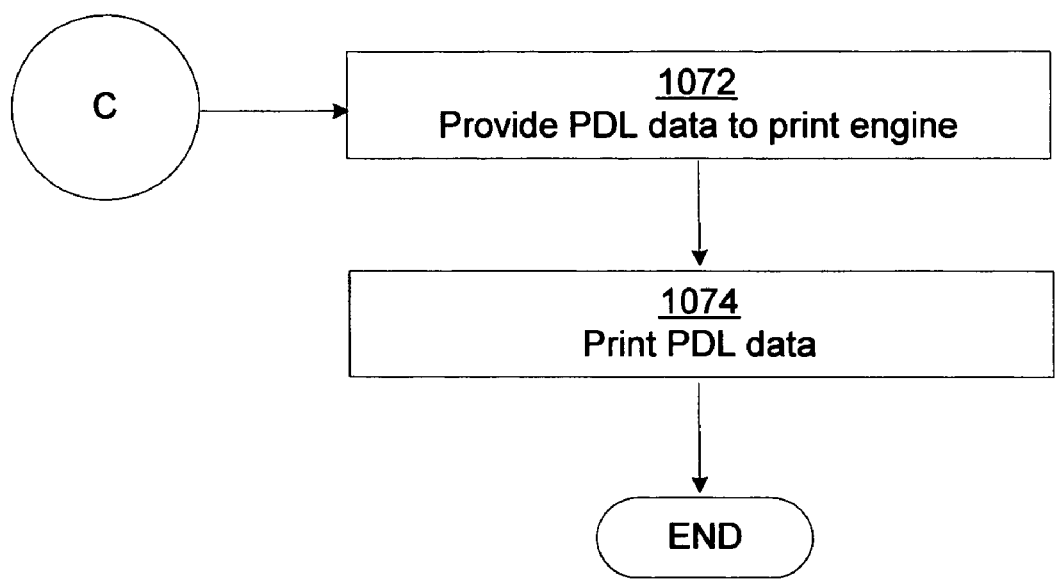
Figure 10D:
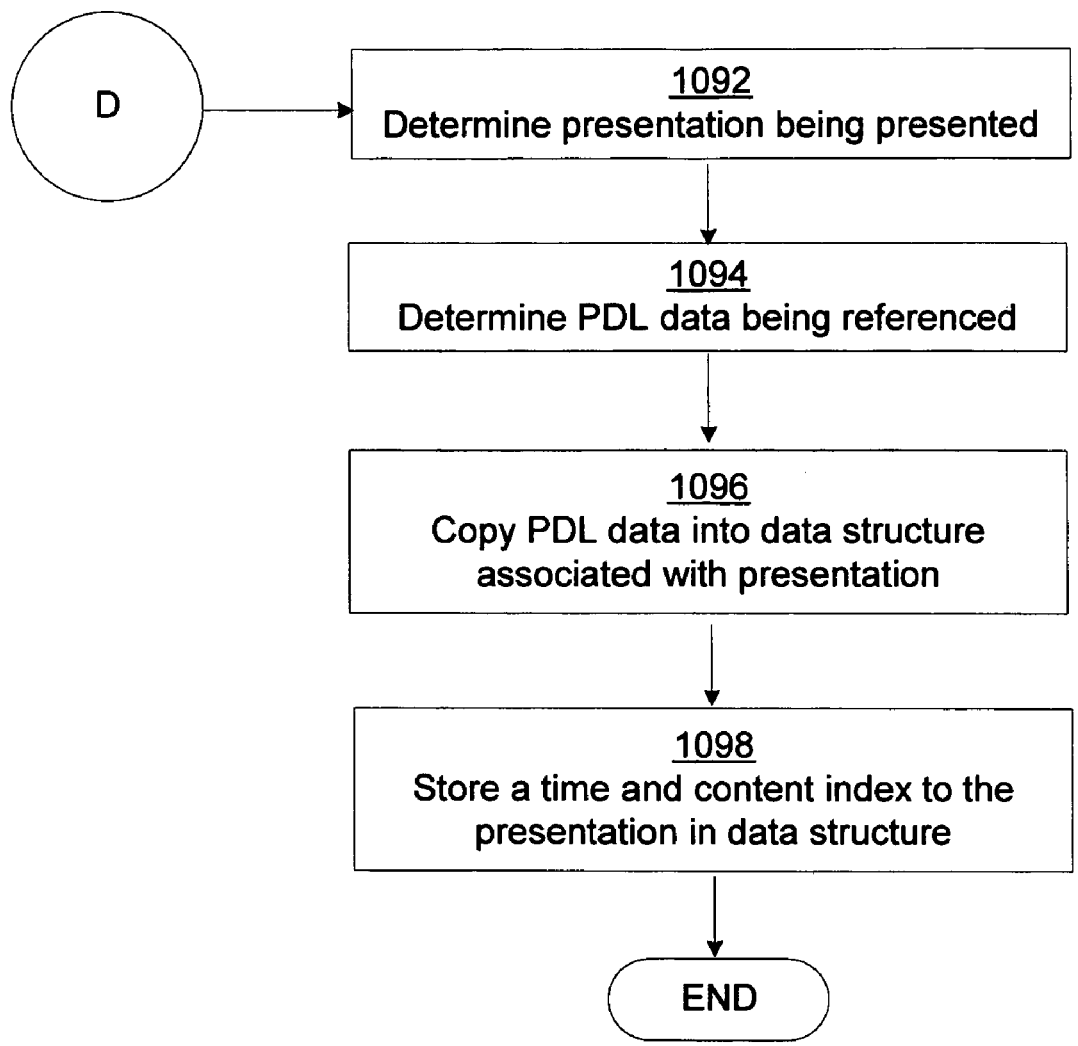
Figure 10E:
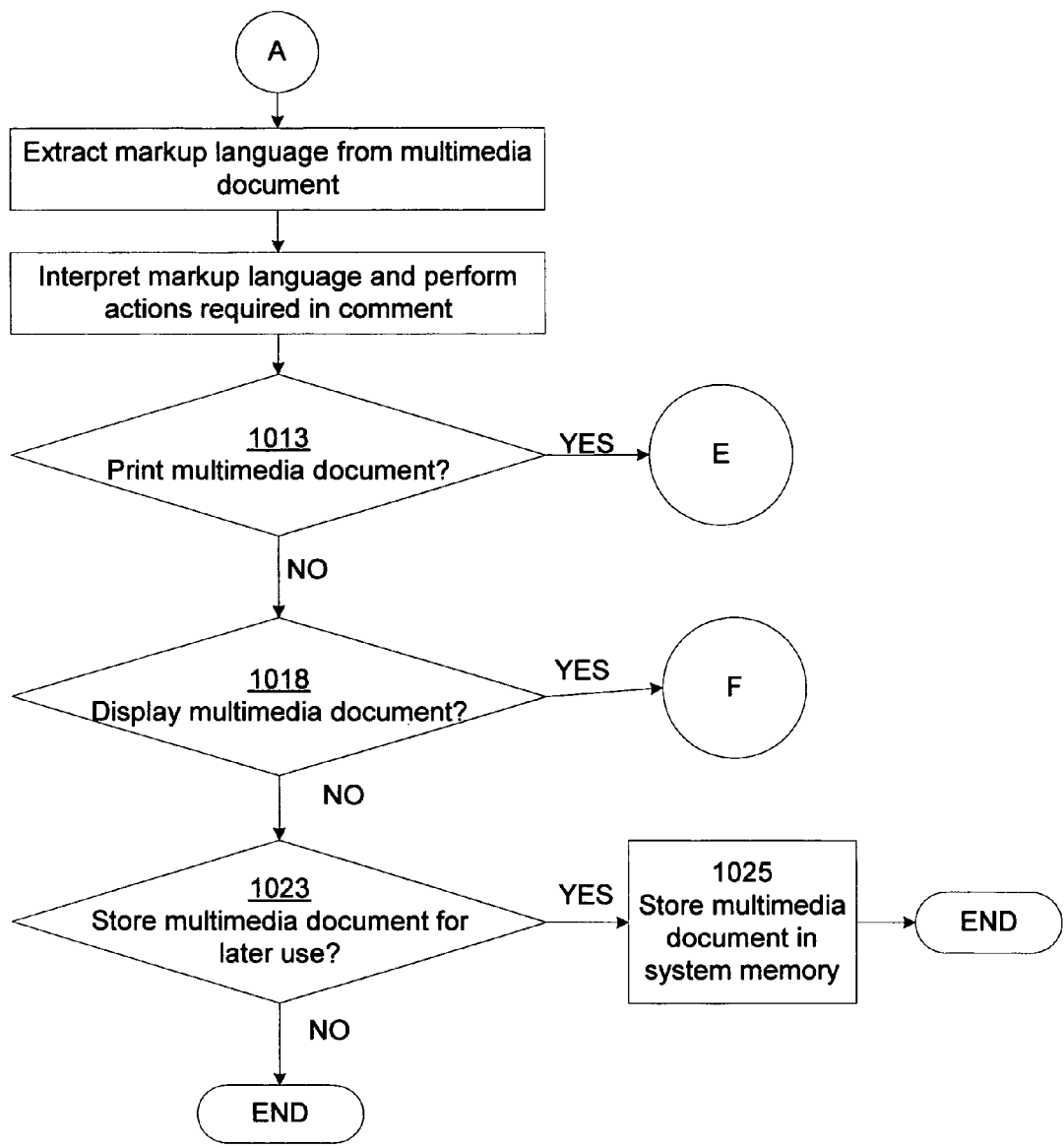
Figure 10F:
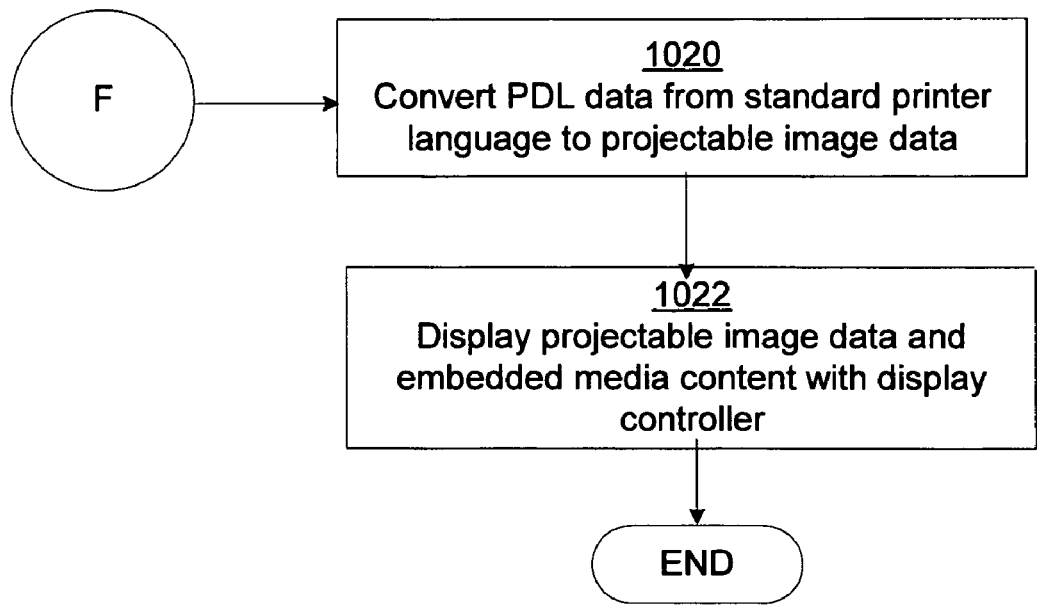
Figure 10G:
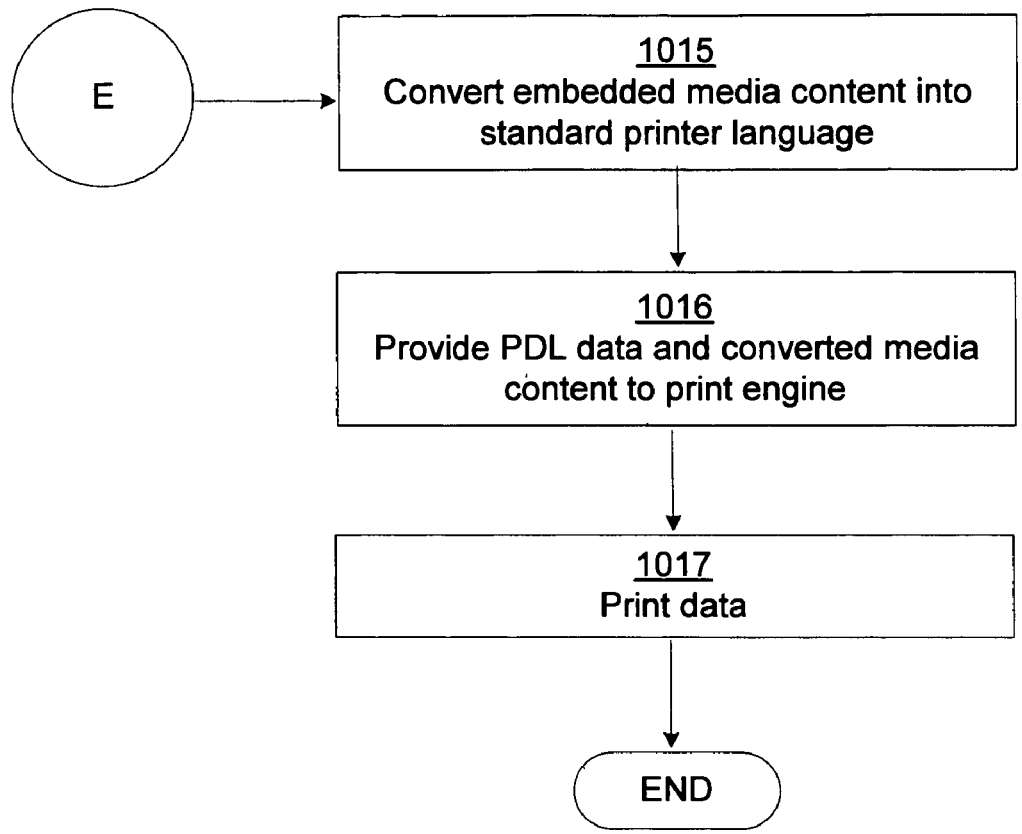

If in step 1010 of FIG. 10A, the multimedia document was determined to contain an embedded portion, the process continues to step 1011 of FIG. 10E. FIGS. 10E-10G are flow diagrams that describe modes of operating the present invention for the case when incoming multimedia document 430 contains special markup language indicating an embedded portion with multimedia content or control instructions. Initially, the system controller 402 receives the incoming document 430 and extracts 1011 the embedded portion from the document 430 and interprets 1012 the markup language in the embedded portion. System controller 402 then sends the interpreted instructions to multimedia image generator 314 to perform the particular actions required by the special markup language. Special markup language embedded within a PDL document can relate to at least the following actions: fetching multimedia data; controlling the display of multimedia presentations; generating an image from graphics primitives (e.g. where the system controller 402 includes a video game engine and graphic instructions can be converted into an image); or adjusting the display parameters associated with a multimedia presentation.

In step 1013, the system controller 402 determines if a print command is associated with the embedded portion of the multimedia document 430. If so, the method continues to step 1015 of FIG. 10G. In step 1015, the system controller 402 provides the extracted media content to the multimedia image generator 414 to convert 1015 the extracted media content to a data format suitable for interpretation by print engine 206. The system controller 402 then provides 1016 the converted media content and the PDL portion of multimedia document 430 to the print engine 206 where the print engine 206 prints 1017 the converted data and PDL data onto document 220 before the process ends.

If in step 1013, the system controller 402 determines the print command is not associated with the input data, the method continues to step 1018 of FIG. 10E to determine if the display command was associated with the multimedia document. If so, the method continues to step 1020 of FIG. 10F. In step 1020, the system controller 402 directs the PDL portion of document 430 to multimedia image generator 314 for conversion 1020 to a projectable image format. System controller 402 then provides the projectable image data and extracted media content to display controller 108 and optics 116 for display 1022 onto screen 118 before the process ends.

If in step 1018, the system controller 402 determines the display command was not associated with the multimedia document, the method continues to step 1023 where the system controller 402 determines whether the command associated with the input data was to store the multimedia document 430 for later use. If so, the system controller 402 provides the multimedia document 430 to storage controller 370 and digital storage 375 such that the multimedia document 430 can be stored 1025 in system memory for later use before the process ends. As an optional extension, multimedia document 430 can be associated with a presentation in a similar fashion described in steps 1092, 1094, 1096, and 1098 of FIG. 10D.

If in step 1023, the system controller 402 determines the command associated with the input data was not to store the image for later use and the multimedia document is not to be associated with a presentation, the process ends.

Figure 8:
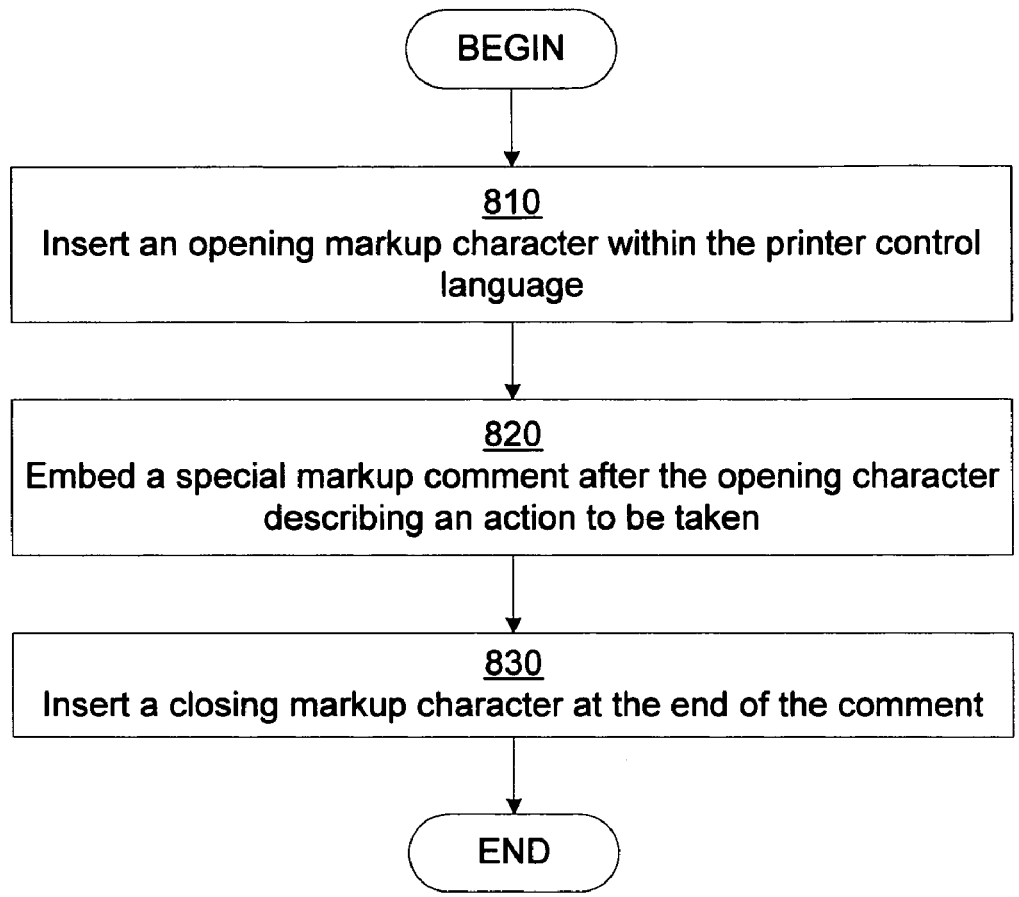
FIG. 8 is a flow diagram that illustrates a method for creating and embedding special tags for fetching/formatting/display of multi-media documents, in accordance with an embodiment of the present invention.

FIG. 8 is a flow diagram illustrating a method for embedding special tags for fetching, formatting, and displaying multimedia documents, according to an embodiment of the present invention. Initially, a document is created in page description language and an opening markup character is inserted 810 within the page description language document indicating the beginning of a comment. After the opening character, a special markup code or comment is embedded 820 describing a particular action to be taken, like fetching, formatting, or controlling a multimedia document. At the end of the comment, a closing markup character is inserted 830 to symbolize the end of a comment. Multimedia driver 340, located on a user's PC 360, is adapted to perform the method shown in FIG. 8.

Figure 9:
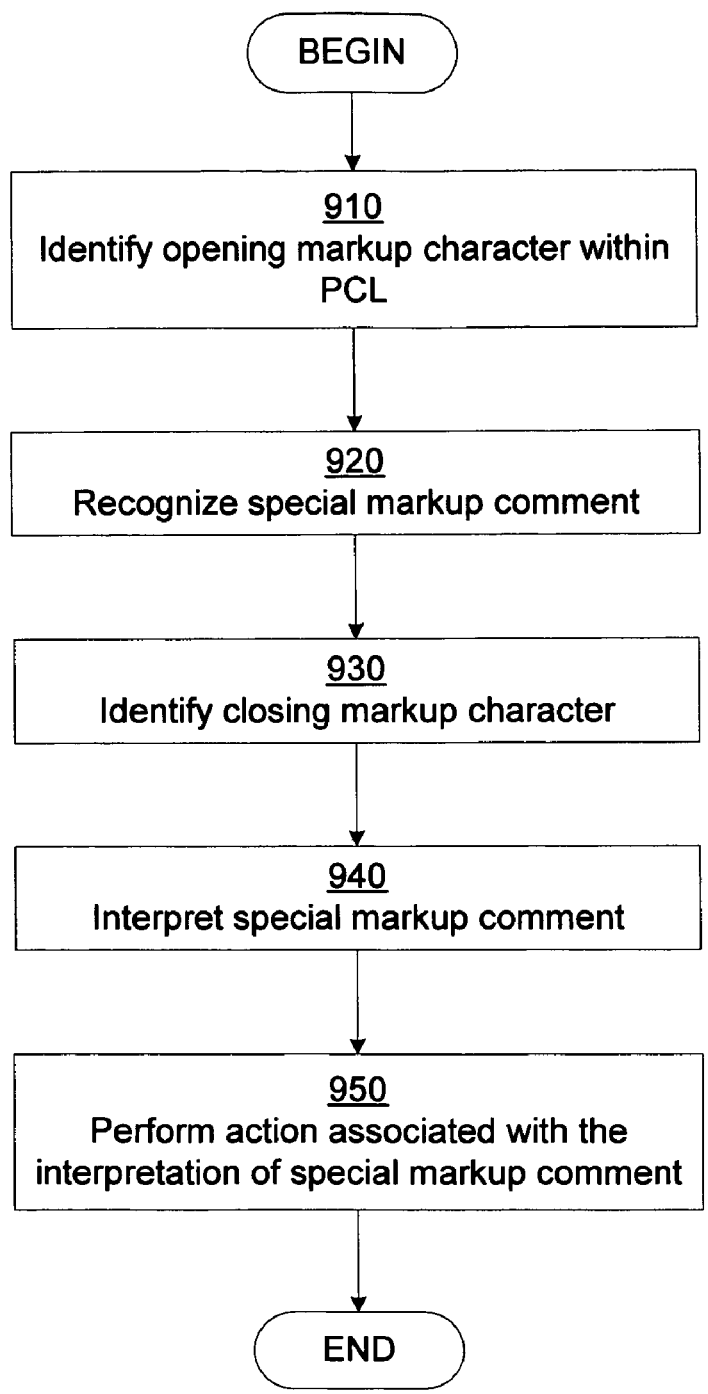
FIG. 9 is a flow diagram that illustrates a method for processing special tags for fetching/formatting/display of multimedia documents, in accordance with an embodiment of the present invention.

FIG. 9 is a flow diagram illustrating a method for interpreting special markup language while processing multimedia documents, according to an embodiment of the present invention. Initially, system controller 402 receives a multimedia document 430 and system controller 402 identifies 910 an opening markup character within the PDL portion of document 430. The system controller 402 recognizes 920 a special markup comment after the opening markup character. The system controller 402 identifies 930 a closing markup character and then interprets 940 the special markup comment. At this point, system controller 402 sends the interpreted comment to multimedia image generator 414 to perform 950 the action associated with the special markup comment.

Figure 11:
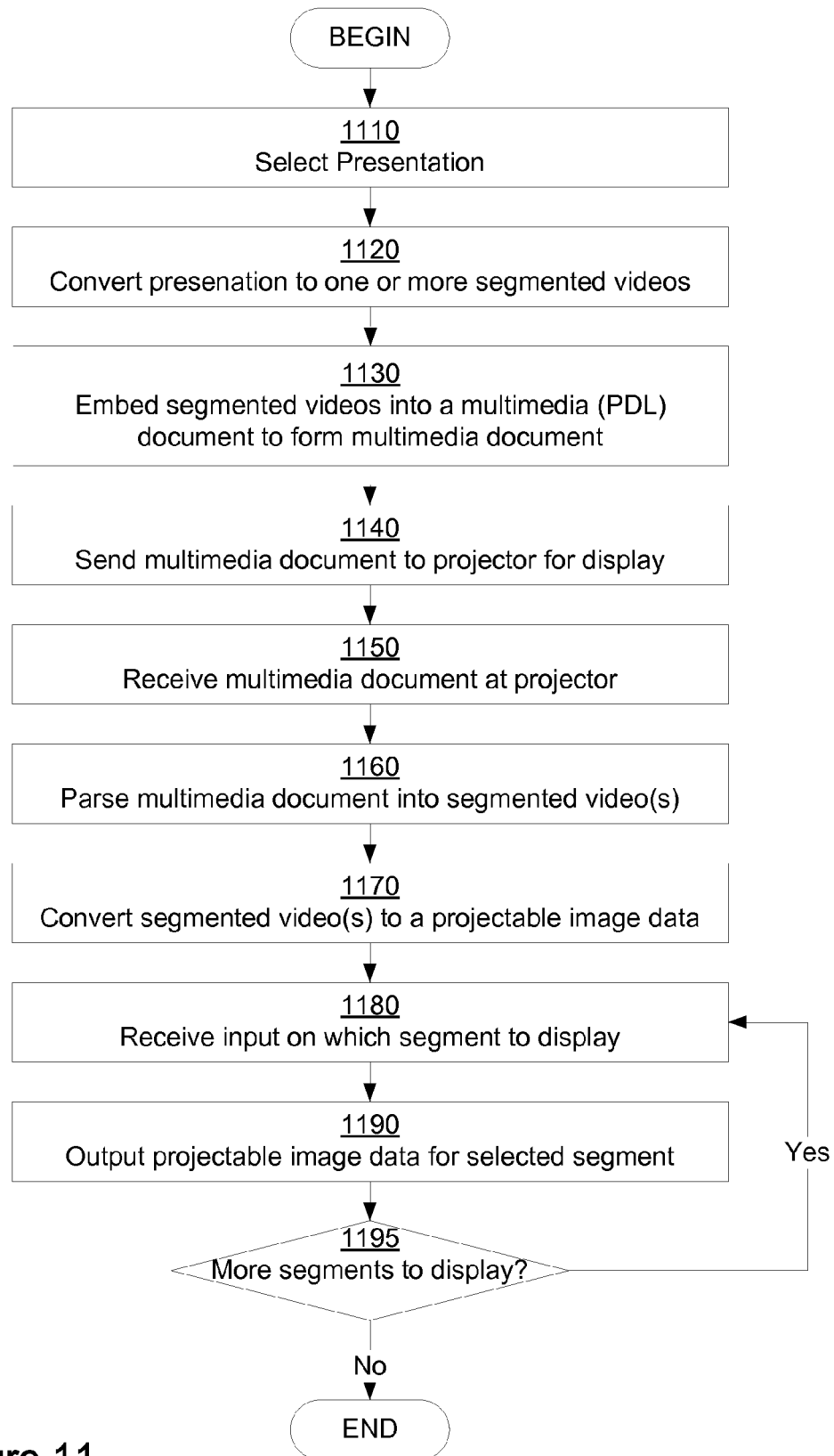
FIG. 11 is another embodiment of a method for displaying or printing images on the multimedia projector/printer 302.

Referring now to FIG. 11, yet another embodiment of a method for displaying or printing images on the multimedia projector/printer 302 of the present invention will be described. In this embodiment, the computing device 460 and projector/printer driver 350 convert a conventional presentation or document using an application running on the computing device 460 to a multimedia document. The multimedia document is sent to the multimedia projector/printer 302 and along with input from the user can be displayed or printed. The process begins by selecting 1110 a presentation for conversion. For example, this could be a presentation in an application program such as PowerPoint® by Microsoft Corporation. While the present invention will now be described using a PowerPoint® by presentation as an example, the present invention may be used with any application program for display, creating or editing images, presentation, video clips or other multimedia data, such as MacroMedia Flash, Adobe FrameMaker, Adobe Acrobat, etc. Once a presentation has been selected, it is converted 1120 to one or more segmented videos. For example, the PowerPoint application can be invoked on the selected presentation, "Enter" commands can be transmitted to the application, and the video and audio that are generated by PowerPoint between each "Enter" can be captured and saved as a set of video segments, one for each time the "enter" key is pressed. This can be done with a software application on the personal computer 460 that runs PowerPoint and simultaneously records video shown on the PC screen and audio output on the PC's speaker. This software application would transmit "Enter" key-presses to PowerPoint, determine when PowerPoint was finished rendering the result of that key press, and record the video and audio produced between the "Enter" key press and the time when PowerPoint completed rendering the data. Exemplary software applications that record video and audio on the PC include Camtasia Pro sold by TechSmith of Okemos, Mich., and Adobe Cool Edit sold by Adobe Systems Incorporated of San Jose, Calif. Typical formats for video segments include avi, wmv (Windows Media), mpeg, mp2, mp4, flash, etc. This technique guarantees that every animation, audio, video, and special effect in the selected presentation will be completely represented in the multimedia document sent to the multimedia projector/printer 302. Each slide in the selected presentation will be converted to at least one video segment. If a slide contains no animations or other multimedia content, the video segment would contain a single video frame. If a slide requires two "Enter" key-presses to reveal all its content because the first "Enter" renders an animation and the second "Enter" displays a line of text, two video segments would be produced, one for the animation and one for the display of the line of text. Thus, a presentation file is converted to N video segments where N is the total number of "Enter" key presses required to display the complete presentation file. The minimum length of each video segment is the time required to render the presentation file after the "Enter" key is pressed. Next, the segmented videos are embedded 1130 into a multimedia document. For example, the video segments could be added to a PDL file with other information about the order of the video segments. Alternatively, the multimedia document could be concatenated video segments (e.g., mp4 clips). This multimedia document is then sent 1140 to the multimedia projector/printer 302. At the multimedia projector/printer 302, the multimedia document is received 1150. The multimedia projector/printer 302 then parses 1160 the multimedia document into segmented video(s) and stores them. Next, the multimedia projector/printer 302 converts 1170 each of the segmented video(s) to a projectable image data. This can be done using the codec 365 and the other component of the multimedia image generator 314. In this embodiment, the multimedia projector/printer 302 is also adapted to receive input from a user, either via a keypad on the multimedia projector/printer 302 or via the I/O controller 310. The input is recognized by the multimedia projector/printer 302 and is used to select which of the converted video segments to output for display. In step 1180, the multimedia projector/printer 302 receives input on which segment to display from the user. The multimedia document preferably has order or sequence information about the video segment such that a user can indicate next video, previous video or jump to a particular video segment and the multimedia projector/printer 302 can retrieve and display the corresponding segment. Once a segment has been identified, the multimedia projector/printer 302 outputs 1190 projectable image data for selected the video segment. Then the method determines 1195 whether there are more segments to display. If so, the method loops back to step 1180 to receive more input from the user. Otherwise the method is complete and ends.

While the present invention has been described with reference to certain preferred embodiments, those skilled in the art will recognize that various modifications may be provided. For example, certain embodiments employ multiple application servers, acting in cooperation to perform a function or request. Any of the above functions or requests can be sent across a network, or using local cables such as IEEE1394, Universal Serial Bus, or wireless networks such as IEEE 802.11 or IEEE 802.15 networks, in any combination. Variations upon and modifications to the preferred embodiments are provided for by the present invention, which is limited only by the following claims.

What is claimed is:

1. A display system comprising:
a controller having an input coupled for receiving a multimedia document, the controller parsing the multimedia document into a first portion and a second portion, the controller translating an embedded instruction in the second portion to perform an instruction for retrieving multimedia data and executing the instruction and the controller further configured for associating the multimedia document with a presentation, wherein associating the multimedia document with the presentation comprises:
   determining that the presentation is being presented;
   copying the multimedia document into a data structure associated with the presentation; and
   storing a time and content index for the presentation in the data structure such that the multimedia document is associated with the presentation,
a converting device, coupled to the controller, for converting the first portion to a projectable image data format suitable for display; and
a display device, coupled to the converting device and the controller, for generating and projecting an image of the projectable image data and the multimedia data on a screen in a display sequence established by the embedded instruction.

2. The system of claim 1, further comprising a retrieving device, coupled to the controller and a remote site, for retrieving multimedia data from the remote site, in accordance with the instruction in the second portion.

3. The system of claim 1, wherein the multimedia data is selected from a group including video data, audio data, or animation data.

4. The system of claim 1, wherein the controller provides the multimedia data to the display device for generation of images.

5. The system of claim 1, wherein the converting device is also capable of converting the multimedia data of the second portion to projectable image data format suitable for display.

6. The system of claim 1 further comprising:
a printing device coupled to the controller, the printing device for printing image data; and
wherein the converting device is capable of converting input data from a printer format to the projectable image data format and for converting input data from the projectable image data format to the printer format.

7. The system of claim 1 further comprising a meeting recording device, coupled to the controller, the recording device for recording incoming audio, video, or print media.

8. The system of claim 1, wherein the embedded instruction is in a special markup language.

9. The system of claim 8, wherein the special markup language contains a control code describing one from a group of resolution, sequence, color, or aspect ratio of multimedia data to be displayed.

10. The system of claim 1, wherein the second portion is in comments of a page description language.

11. The system of claim 10, wherein the page description language is postscript or PCL.

12. The system of claim 1, wherein the converting device includes a multimedia unit and a database, the multimedia unit translating the second portion into instructions and data, and the database storing multimedia data, the multimedia unit and the database coupled to the controller and the display device.

13. The system of claim 1, further comprising a driver for creating a multimedia document, the driver coupled to receive multimedia content and create the multimedia document having a first portion and the second portion.

14. A method for outputting a multimedia document, the method comprising the steps of:
receiving the multimedia document;
parsing the multimedia document into a first portion and a second portion;
converting the first portion of the multimedia document to projectable image data;
interpreting an embedded instruction in the second portion to perform an action for retrieving multimedia data;
performing the action;
outputting the projectable image data and the multimedia data on a screen in a display sequence established by the embedded instruction;
associating the multimedia document with a presentation, comprising:
determining that the presentation is being presented;
copying the multimedia document into a data structure associated with the presentation; and
storing a time and content index for the presentation in the data structure such that the multimedia document is associated with the presentation.

15. The method of claim 14, further comprising the steps of:
creating a print document in a page description language.

16. The method of claim 14, wherein the second portion includes an address of a remote site from which to retrieve the multimedia data.

17. The method of claim 14, wherein the embedded instruction is in a special markup language.

18. The method of claim 14, wherein the second portion includes a control code describing one from the group of resolution, sequence, color, or aspect ratio of multimedia data to be displayed.

19. The method of claim 14, further comprising the steps of:
providing the first portion of the multimedia document to a print engine; and
printing the first portion.

20. The method of claim 14, further comprising the step of storing the multimedia document in a projector memory for later use.

21. The method of claim 14 further comprising the steps of:
retrieving multimedia data using the second portion of the multimedia document;
providing the first portion of multimedia document to a print engine;
converting the retrieved multimedia data into a data file formatted in a standard printer language;
providing the data file to the print engine; and
printing the first portion of the multimedia document and the data file in a print sequence established by instructions in the second portion of the multimedia document.

22. A method for creating a multimedia document in a digital projection system including a personal computer and a digital projector, the method comprising the steps of:
creating a first document in page description language at the personal computer;
creating a presentation document with a presentation format at the personal computer;
converting the presentation document into video data at the personal computer;
embedding the video data into the first document at the personal computer; and
transmitting the first document from the personal computer to an I/O controller of the digital projector for:
parsing the first document, with a parsing device, the parsing device coupled to the I/O controller, into a first portion and a second portion, where the first portion contains the page description language and the second portion contains the video data;
converting the first portion of the multimedia document into projectable image data suitable for display; and
projecting an image of the projectable image data and the video data, in accordance with a display embedded within the presentation format.

23. The method of claim 22 wherein the step of embedding includes inserting the video data in the first document by adding a comment that includes the video data.

24. The method of claim 22 wherein the step of converting, also converts the video data to projectable image data suitable for display.

25. A method for displaying a multimedia document using a projector, the method comprising the steps of:
receiving the multimedia document;
parsing the multimedia document into a printer format portion and a comment portion, wherein the comment portion includes an instruction to retrieve multimedia data from a remote site;
converting the printer format portion of the multimedia document into projectable image data suitable for display;
interpreting the comment portion of the multimedia document to control display of the projectable image data;
performing the instruction in the interpreted comment portion to retrieve the multimedia data from the remote site;
generating and projecting an output image from the converted projectable image data and projecting the multimedia data in a display sequence established by the comment.

26. A method for creating a multimedia document in a digital projection system including a personal computer and a digital projector, the method comprising the steps of:
creating a first document in page description language at the personal computer;
retrieving at the personal computer a presentation in a presentation format;
converting the presentation into one or more video segments at the personal computer;
embedding at the personal computer the one or more video segments in the first document;
transmitting the first document to the digital projector for:
parsing the first document into the one or more video segments;
converting the one or more video segments into projectable image data suitable for display; and
projecting an image of the projectable image data.

27. The method of claim 26 wherein the step of embedding includes inserting information about an order of the one or more video segments.

28. The method of claim 26 wherein the one or more video segments are concatenated together.

29. The method of claim 26 wherein the step of projecting is responsive to user input received at the projector.

* * * * *